United States Patent
Bae et al.

(10) Patent No.: US 11,194,209 B2
(45) Date of Patent: Dec. 7, 2021

(54) SMART WINDOW SYSTEM AND CONTROL METHOD THEREFOR

(71) Applicant: Samsung Electronics Co., Ltd., Suwon-si (KR)

(72) Inventors: Jun Cheol Bae, Suwon-si (KR); Hyun Min Song, Suwon-si (KR); Jong Hyun Ryu, Suwon-si (KR); Ji Su Jung, Yongin-si (KR); Yong Ho Kim, Seoul (KR); Hong Suk Kim, Seoul (KR); Byung Hwa Seo, Seongnam-si (KR); Tatsuhiro Otsuka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/760,577

(22) PCT Filed: Sep. 5, 2016

(86) PCT No.: PCT/KR2016/009898
§ 371 (c)(1),
(2) Date: Mar. 15, 2018

(87) PCT Pub. No.: WO2017/047958
PCT Pub. Date: Mar. 23, 2017

(65) Prior Publication Data
US 2018/0259804 A1     Sep. 13, 2018

(30) Foreign Application Priority Data
Sep. 15, 2015  (KR) .................. 10-2015-0130030

(51) Int. Cl.
*G02F 1/137* (2006.01)
*G02F 1/133* (2006.01)
(Continued)

(52) U.S. Cl.
CPC ............ *G02F 1/13718* (2013.01); *B60J 3/04* (2013.01); *E06B 9/24* (2013.01); *G02F 1/137* (2013.01);
(Continued)

(58) Field of Classification Search
None
See application file for complete search history.

(56) References Cited

U.S. PATENT DOCUMENTS 5,296,952 A  *  3/1994  Takatsu ............... G02F 1/13476
                                                                 349/77
6,072,549 A        6/2000  Faris et al.
(Continued)

FOREIGN PATENT DOCUMENTS

CN    103210345 A    7/2013
CN    103959436 A    7/2014
(Continued)

OTHER PUBLICATIONS

European Patent Office, "Supplementary European Search Report," Application No. EP 16846779.3, dated Oct. 12, 2018, 13 pages.
(Continued)

*Primary Examiner* — Edward J Glick
*Assistant Examiner* — Anthony G Quash

(57) ABSTRACT

The present disclosure is directed to providing to a smart window system capable of controlling a state of a display element (e.g., at least one of transparency, color, pattern, gradation degree, and displayed information) through various kinds of input devices and a control method thereof. In accordance with one aspect of the present disclosure, a smart window system may include a display element; an input device configured to receive a control command for the display element; and a controller configured to determine at least one of transparency, color, pattern, and gradation of
(Continued)

the display element and information displayed on the display element on the basis of the control command.

15 Claims, 52 Drawing Sheets

(51) Int. Cl.
| | | |
|---|---|---|
| *G02F 1/1333* | (2006.01) | |
| *G02F 1/1347* | (2006.01) | |
| *E06B 9/24* | (2006.01) | |
| *G06F 3/01* | (2006.01) | |
| *B60J 3/04* | (2006.01) | |
| *H04M 1/725* | (2021.01) | |

(52) U.S. Cl.
CPC ............ *G02F 1/13306* (2013.01); *G06F 3/01* (2013.01); *H04M 1/725* (2013.01); *E06B 2009/2417* (2013.01); *E06B 2009/2464* (2013.01); *G02F 1/13318* (2013.01); *G02F 1/13478* (2021.01); *G02F 1/13737* (2013.01); *G02F 2202/04* (2013.01); *G02F 2202/36* (2013.01); *G02F 2203/48* (2013.01)

(56) References Cited

U.S. PATENT DOCUMENTS

| | | | | |
|---|---|---|---|---|
| 6,671,008 | B1 * | 12/2003 | Li | ........................ B82Y 15/00 349/16 |
| 6,842,209 | B2 * | 1/2005 | Sumiyoshi | ............ G02F 1/1334 349/114 |
| 8,889,469 | B2 | 11/2014 | Jackrel et al. | |
| 2005/0099373 | A1 * | 5/2005 | Funfschilling | ....... G02B 5/3016 345/87 |
| 2006/0290651 | A1 * | 12/2006 | Verhaegh | .......... G02F 1/133555 345/107 |
| 2009/0027759 | A1 * | 1/2009 | Albahri | ..................... E06B 9/24 359/277 |
| 2010/0214501 | A1 * | 8/2010 | Lee | ....................... G02F 1/1347 349/33 |
| 2012/0128336 | A1 * | 5/2012 | Kato | ................... F27B 17/0025 392/416 |
| 2013/0093969 | A1 | 4/2013 | Li et al. | |
| 2013/0258266 | A1 * | 10/2013 | Sukhomlinova | ..... C09K 19/601 349/179 |
| 2014/0078410 | A1 * | 3/2014 | Wang | ..................... G03B 21/16 349/5 |

FOREIGN PATENT DOCUMENTS

| | | | | |
|---|---|---|---|---|
| DE | 102011015950 A1 * | 10/2012 | ......... G02F 1/13439 |
| EP | 2515164 A1 | 10/2012 | |
| KR | 10-2004-0006941 A | 1/2004 | |
| KR | 10-2007-0058149 A | 6/2007 | |
| KR | 20070058149 A * | 6/2007 | ........... G02F 1/1347 |
| KR | 10-2011-0068336 A | 6/2011 | |
| KR | 10-2013-0112521 A | 10/2013 | |
| KR | 10-1542684 B1 | 8/2015 | |
| KR | 101542684 B1 * | 8/2015 | ............. G06F 13/14 |
| KR | 101542684 B1 † | 8/2015 | |
| KR | 101773817 B1 † | 9/2017 | |
| WO | 2005/024501 A1 | 3/2005 | |

OTHER PUBLICATIONS

ISA/KR, "International Search Report and Written Opinion of the International Searching Authority," International Application No. PCT/KR2016/009898, dated Dec. 14, 2016, 14 pages.
Supplementary Partial European Search Report dated Jul. 6, 2018 in connection with European Patent Application No. 16 84 6779.
Communication pursuant to Article 94(3) EPC dated Feb. 21, 2020 in connection with European Patent Application No. 16 846 779.3, 3 pages.
Office Action dated Sep. 1, 2020 in connection with Chinese Patent Application No. 201680066745.5, 26 pages.
Communication pursuant to Article 94(3) EPC dated Sep. 28, 2020 in connection with European Patent Application No. 16 846 779.3, 12 pages.
Office Action dated Feb. 22, 2021 in connection with India Patent Application No. 201817014025, 6 pages.
Office Action dated May 18, 2021 in connection with Chinese Patent Application No. 201680066745.5, 23 pages.

\* cited by examiner
† cited by third party (a)     (b)

(a)

(b)

(a)

(b)

(a)

(b)

SMART WINDOW SYSTEM AND CONTROL METHOD THEREFOR

CROSS-REFERENCE TO RELATED APPLICATIONS AND CLAIM OF PRIORITY

The present application is a 371 of International Application No. PCT/KR2016/009898 filed on Sep. 5, 2016, which claims priority to Korean Patent Application No. 10-2015-0130030 filed on Sep. 15, 2015, the disclosures of which are herein incorporated by reference in their entirety.

TECHNICAL FIELD

The present invention relates to a smart window system using a cholesteric liquid crystal (CLC) and a control method therefor.

BACKGROUND

A smart window generally refers to a window capable of controlling the amount of light or heat passing through the window by varying light transmittance when a voltage is applied to the window. That is, a smart window can be changed to a transparent, opaque, or translucent state by an applied voltage, and is also called a variable transmittance glass, a dimmer glass, or a smart glass.

Recently, various methods for implementing a smart window have been proposed. In particular, research is being conducted on a method of changing light transmittance by means of a cholesteric liquid crystal (CLC).

SUMMARY

According to an aspect, the present disclosure is directed to providing to a smart window system capable of controlling a state of a display element (e.g., at least one of transparency, color, pattern, gradation degree, and displayed information) through various kinds of input devices and a control method thereof.

Specifically, the present disclosure is directed to providing a smart window system capable of controlling a state of a display element through a mobile device such as a smartphone, an input/control device installed at a front portion of a vehicle such as an AVN (Audio/Video/Navigation) device, a sensor such as an illuminance sensor, and a vehicle operating unit such as a dial operating unit and a control method thereof.

According to another aspect, the present disclosure is directed to providing a display element including a transparency adjustment layer in which a black dye is mixed with a cholesteric liquid crystal.

According to still another aspect, the present disclosure is directed to providing a display element including a quantum layer in which a quantum rod is mixed with a liquid crystal.

In accordance with one aspect of the present disclosure, a smart window system may include a display element; an input device configured to receive a control command for the display element; and a controller configured to determine at least one of transparency, color, pattern, and gradation of the display element and information displayed on the display element on the basis of the control command.

The smart window may further include a sensor unit configured to collect ambient information to control a state of the display element, wherein the sensor unit includes at least one of an illuminance sensor, a temperature sensor, a distance sensor, a voice sensor, and a gesture sensor.

The display element may include: a transparency adjustment layer switched to a transparent mode or an opaque mode depending on whether power is applied; and a liquid crystal layer disposed adjacent to the transparency adjustment layer.

The transparency adjustment layer may include a cholesteric liquid crystal molecule and a black dye configured to form a helical structure along with the cholesteric liquid crystal molecule.

The transparency adjustment layer may operate in the transparent mode when an electric field is applied to the transparency adjustment layer and operates in the opaque mode when no electric field is applied to the transparency adjustment layer.

The liquid crystal layer may have a structure in which a first layer and a second layer are bonded to each other by using a buffer layer as a boundary therebetween, and cholesteric liquid crystals with different types of chirality may be contained in the first layer and the second layer.

The liquid crystal layer may include a plurality of liquid crystal layers configured to reflect light having different wavelength ranges, and the plurality of liquid crystal layers may be stacked vertically with respect to the display element or horizontally with respect to a virtual plane parallel to the display element.

The display element may further include a quantum layer including a liquid crystal molecule and a quantum rod having a surface to which surfactant is bonded.

The liquid crystal molecule may include at least one of a cholesteric liquid crystal molecule and a nematic liquid crystal molecule.

The quantum layer may be arranged horizontally with respect to a virtual plane parallel to the display element.

The surfactant may be bonded to at least one of both ends of the quantum rod, and The surfactant may have a portion bonded to the quantum rod and having a property of being favorable to the quantum rod and another portion having a property of being favorable to the liquid crystal molecule.

The smart window may further include a communicator configured to receive a control command for the display element from the input device.

In accordance with another aspect of the present disclosure, a control method of a smart window system including an input device configured to receive a control command for a display element; and a smart window device including a display element including a transparency adjustment layer switched to a transparent mode or an opaque mode depending on whether power is applied and a liquid crystal layer disposed adjacent to the transparency adjustment layer and a communicator configured to receive a control command for the display element from the input device, may include receiving a control command for the display element through the input device; delivering the control command to the display element through the communicator; and adjusting power applied to at least one of the transparency adjustment layer and the liquid crystal layer according to the control command to control at least one of transparency, color, pattern, and gradation of the display element and information displayed on the display element.

The control method may further include setting a control mode of the display element to an automatic mode or a manual mode.

The control method may further include collecting ambient information, wherein a state control condition of the display element is determined according to the collected information, and a state of the display element is controlled according to the state control condition.

According to an aspect, it is possible to control a state of the display element by means of various input devices. In detail, it is possible to control at least one of color, transparency, pattern, and gradation of the display element and information displayed on the display element in order to perform mood control.

DETAILED DESCRIPTION

Hereinafter, a smart window system and a control method therefor will be described in detail with reference to the accompanying drawings.

A smart window system according to an aspect may include an input device and a smart window device.

A smart window system according to another aspect may include a sensor unit and a smart window device.

The input device may include a mobile device (such as a smartphone), an audio/video/navigation (AVN) device, and the like, but examples of the input device are not limited thereto. The sensor unit may include an illuminance sensor, a temperature sensor, a gesture sensor, a voice sensor, a distance sensor, and the like, but examples of the sensor are not limited thereto.

The smart window device may include a display element that functions as a smart window. Depending on the embodiment, the smart window device may include a communicator configured to receive a control command for the display element or a controller configured to perform operations for controlling a state of the display element. A smart window generally refers to a display element capable of controlling the amount of light or heat passing therethrough by varying light transmittance when a voltage is applied. That is, a smart window can be changed to a transparent, opaque, or translucent state by an applied voltage, and such a smart window may be applied to a showcase, an information window, a vehicle window, a vehicle head-up display, and the like. In addition, a display element may include an organic light emitting diode (OLED), a light emitting diode (LED), a liquid crystal display (LCD), and electrochromic device, etc., but examples of the display element are not limited thereto.

Hereinafter, an embodiment of the present invention will be described by using an example in which a smart window system is applied to a vehicle. That is, a smart window system according to an embodiment may be applied to a vehicle, and a display element of the smart window system may have a state adjustable by an input device. More specifically, transparency, color, pattern, and gradation of the display element and information displayed on the smart window may be adjusted through the input device.

Figure 1:
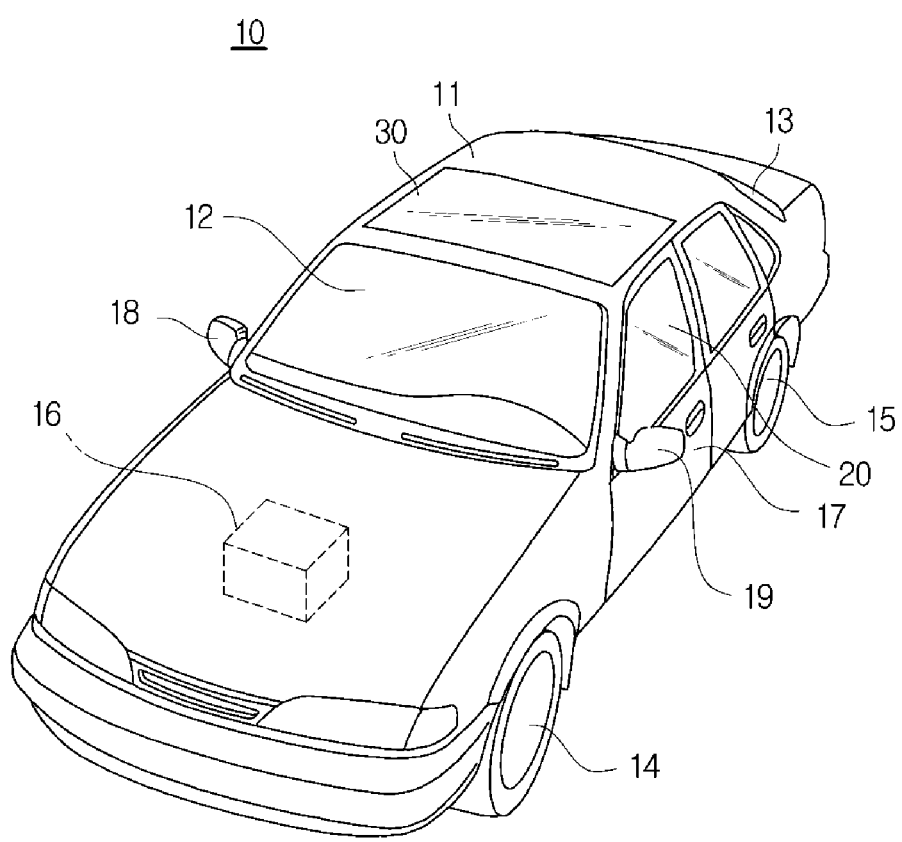
FIG. 1 is an example diagram of a vehicle 10 to which a smart window system is applied according to an embodiment.

FIG. 1 is an example diagram of a vehicle 10 to which a smart window system is applied according to an embodiment.

Referring to FIG. 1, the vehicle 10 may include a main body 11 configured to form an outer appearance of the vehicle 10, a front glass 12 configured to provide a field of view for an area in front of the vehicle 10 inside the vehicle 10, a rear glass 13 configured to provide a field of view for an area behind the vehicle 10, wheels 14 and 15 configured to move the vehicle 10, a drive device 16 configured to rotate the wheels 14 and 15, a door 17 configured to shield the inside of the vehicle 10 from the outside, and side mirrors 18 and 19 configured to provide a field of view for an area behind the vehicle 10 to a driver.

The front glass 12 is provided on a front upper side of the main body 11 so that the driver inside the vehicle 10 may acquire visual information about the area in front of the vehicle 10 and is also called a windshield glass.

The rear glass 13 is provided on a rear upper side of the main body 11 so that the driver inside the vehicle 10 may acquire visual information about the area behind the vehicle 10.

The wheels 14 and 15 include front wheels 14 provided at a front side of the vehicle 10 and rear wheels 15 provided at a rear side of the vehicle 10. The drive device 16 provides a rotational force to the front wheels 14 or the rear wheels 15 so that the main body 11 moves forward or backward. The drive device 16 may employ an engine configured to burn fossil fuel to generate a rotational force or a motor configured to receive power from a capacitor (not shown) and generate a rotational force.

The door 17 is pivotably provided at left and right sides of the main body 11 to enable the driver to ride the vehicle 10 when the door 17 is open and to shield the inside of the vehicle 10 from the outside when the door 17 is closed. A side glass 20 through which the inside or the outside can be viewed from the outside or the inside may be installed at the door 17. Depending on the embodiment, the side glass 20 may be provided so that only one side can be viewed from the other side and may be capable of being opened or closed.

Meanwhile, depending on the embodiment, a sunroof 30 may be provided on a top surface of the main body 11 of the vehicle 10. The smart window system according to the disclosed invention may be applied to the sunroof 30 of the vehicle 10 in addition to the front glass 12, the rear glass 13, and the side glass 20. Thus, a state (e.g., color, transparency, pattern, gradation, displayed information, or the like) of the front glass 12, the rear glass 13, the side glass 20 or the sunroof 30 may be adjusted depending on the situation.

The front glass 12, the rear glass 13, the side glass 20, and the sunroof 30 may be referred to as vehicle windows 12, 13, 20, and 30. A structure of a display element applied to the vehicle windows 12, 13, 20, and 30 provided to function as smart windows will be described in detail below.

Figure 2:
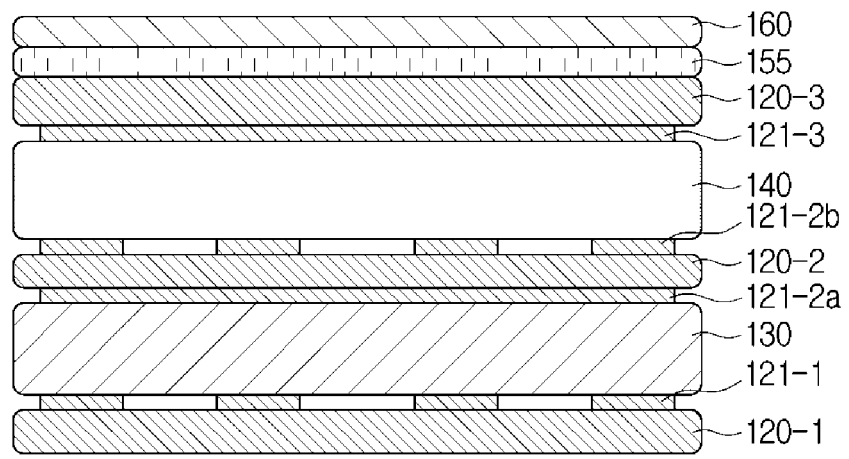
FIG. 2 is a view showing an example of a display element 110 according to an embodiment.

FIG. 2 is a view showing an example of a display element 110 according to an embodiment.

Referring to FIG. 2, the display element 110 includes a first substrate 120-1, a transparency adjustment layer 130 disposed adjacent to the first substrate 120-1, a second substrate 120-2 disposed adjacent to the transparency adjustment layer 130, a liquid crystal layer 140 disposed adjacent to the second substrate 120-2, and a third substrate 120-3 disposed adjacent to the liquid crystal layer 140.

Here, disposition of "A" adjacent to "B" may refer to a case in which "A" (e.g., the first substrate 120-1) is bonded to an upper surface or a lower surface of "B" (e.g., the transparency adjustment layer 130) and, depending on the embodiment, may refer to a case in which "A" is disposed adjacent to "B" with other structures (e.g., a first electrode 121-1) except "A" and "B" interposed therebetween.

The display element 110 according to this embodiment may have a structure in which an electrode is disposed on at least one surface of each layer. In detail, the first electrode 121-1 may be disposed on a surface of the first substrate 120-1, a second-prime electrode 121-2a may be disposed on a surface of the second substrate 120-2 facing the first substrate 120-1, a second-double-prime electrode 121-2b may be disposed on a surface of the second substrate 120-2 facing the third substrate 120-3, and a third electrode 121-3 may be disposed on a surface of the third substrate 120-3.

Also, a first alignment layer for aligning liquid crystal molecules provided on the transparency adjustment layer 130 may be disposed on the first electrode 121-1, a second-prime alignment layer for aligning the liquid crystal molecules provided on the transparency adjustment layer 130 may be disposed on the second-prime electrode 121-2a, a second-double-prime alignment layer for aligning liquid crystal molecules provided on the liquid crystal layer 140 may be disposed on the second-double-prime electrode 121-2b, and a third alignment layer for aligning the liquid crystal molecules provided on the liquid crystal layer 140 may be disposed on the third electrode 121-3.

Here, the first, second, and third substrates 120-1, 120-2, and 120-3 may be made of a flexible glass or transparent plastic material. When a plastic material is used, the display element 110 may be implemented to be thin and light. Also, in this case, the display element 110 may be freely bent or warped and thus may be applied to new devices in various fields on the basis of the freedom of design.

The first, second-prime, second-double-prime, and third electrodes 121-1, 121-2a, 121-2b, and 121-3 may use a transparent electrode in order to increase transmittance of the display element 110. The transparent electrode may be formed on a transparent conductive material, and indium tin oxide (ITO), indium zinc oxide (IZO), aluminum-doped zinc oxide (ZAO), or the like may be used as an example of the transparent conductive material. Depending on the embodiment, it will be appreciated that the transparent electrode may be formed of a nano material including silver nanowires, a metallic material including copper, or a conductive polymer material including PeDOT.

The first and second-prime electrodes 121-1 and 121-2a may be disposed as straight lines parallel to the first substrate 120-1 and the second substrate 120-2, respectively. In this case, the two electrodes may intersect perpendicularly to each other, and the intersection may form one pixel. The second-double-prime and third electrodes 121-2b and 121-3 may be disposed as straight lines parallel to the second substrate 120-2 and the third substrate 120-3, respectively. In this case, the two electrodes may intersect perpendicularly to each other, and the intersection may form one pixel.

The liquid crystal layer 140, which is a layer provided to implement red color, green color, or blue color, may be provided between the second substrate 120-2 and the third substrate 120-3.

Figure 3:
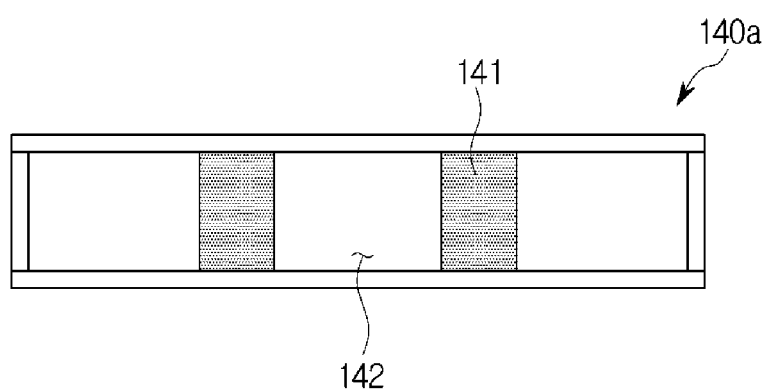
FIG. 3 is an enlarged view of a structure of a liquid crystal layer 140a according to an example of an embodiment.
Figure 4:
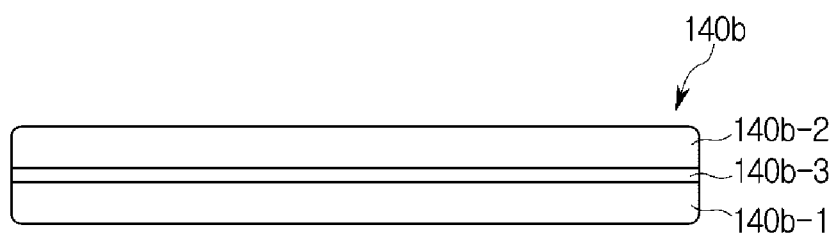
FIG. 4 is an enlarged view of a structure of a liquid crystal layer 140b according to another example of an embodiment.

FIG. 3 is an enlarged view of a structure of a liquid crystal layer 140a according to an example of an embodiment, and FIG. 4 is an enlarged view of a structure of a liquid crystal layer 140b according to another example of an embodiment.

Referring to FIG. 3, the liquid crystal layer 140a may be provided as a single layer. The liquid crystal layer 140a may be partitioned by a plurality of spacers 141 to form a plurality of sub-cells 142, and each of the sub-cells 142 may contain a cholesteric liquid crystal.

Referring to FIG. 4, the liquid crystal layer 140b may include a first layer 140b-1 and a second layer 140b-2, and the first layer 140b-1 and the second layer 140b-2 may be partitioned by a buffer layer 140b-3. The liquid crystal layer 140 according to the embodiment may also be partitioned by a plurality of spacers to form a plurality of sub-cells, and each of the sub-cells may contain a cholesteric liquid crystal. In this case, the first layer 140b-1 and the second layer 140b-2 may contain cholesteric liquid crystals with different types of chirality. As a result, it is possible to implement brighter colors.

Hereinafter, cholesteric liquid crystal molecules contained in the liquid crystal layer 140 will be described in more detail below.

Figure 5:
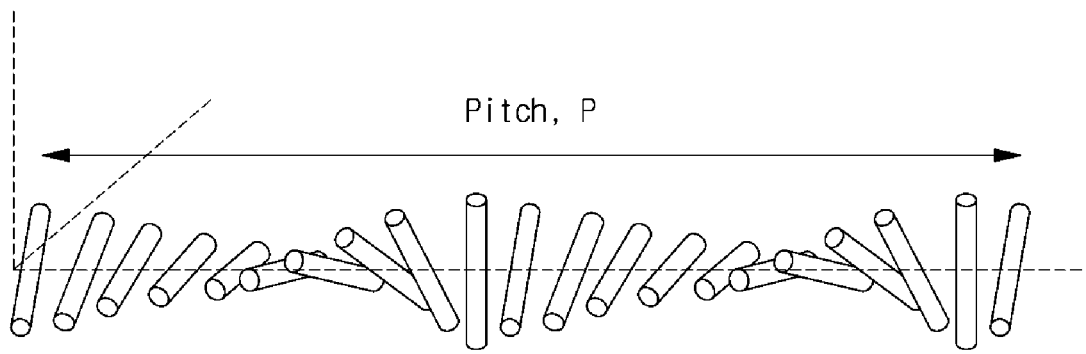
FIG. 5 is an example diagram of a cholesteric liquid crystal molecule provided on the liquid crystal layer 140 of the display element 110 according to an embodiment.

The liquid crystal layer 140 may include a cholesteric liquid crystal molecule formed by mixing a chiral dopant for inducing a periodic helical structure with a nematic liquid crystal molecule. FIG. 5 is an example diagram of a cholesteric liquid crystal molecule provided on the liquid crystal layer 140 of the display element 110 according to an embodiment.

Referring to FIG. 5, the cholesteric liquid crystal molecule is formed by repeating a molecular twist at regular intervals. In this case, the repeated interval is called a pitch p, and the cholesteric liquid crystal molecule may have the property of selectively reflecting light according to the pitch.

In detail, a reflected wavelength range of the light reflected by the cholesteric liquid crystal molecule may be determined by the pitch p. When the cholesteric liquid crystal molecule has an average refractive index of n, a wavelength at which the reflection becomes maximum may be determined as $\lambda = n \cdot p$. Here, the pitch p may be adjusted according to the content of the chiral dopant. As the content of the chiral dopant increases, the pitch p may decrease, and thus the reflection wavelength range may decrease.

For example, it is possible to implement color by adjusting the reflection wavelength range to within the range of 380 nm to 780 nm (a visible light range). In detail, blue color may be implemented by reflecting light of about 380 nm to about 480 nm, green color may be implemented by reflecting light of about 480 nm to about 510 nm, and red color may be implemented by reflecting light of about 570 nm to about 780 nm.

The cholesteric liquid crystal molecule may selectively reflect light according to a helical twist direction. In other words, the cholesteric liquid crystal molecule may selectively reflect light according to its chiral properties. When the pitch has the same value, light having the same wavelength range is reflected, and only the direction of the reflected light is different. Accordingly, it is possible to implement clearer colors.

The liquid crystal layer 140 may form various types of texture depending on an electric field applied to the liquid crystal layer 140. The liquid crystal layer 140 may reflect, scatter, or transmit light incident on the liquid crystal layer 140 according to the formed texture.

The type of the texture formed by the liquid crystal layer 140 may be classified into a planer state, a focal conic state, and a homeotropic state.

In detail, the liquid crystal layer 140 may have bistability in which the liquid crystal layer 140 can be present in the planer state and the focal conic state when there is no electric field. In this case, the liquid crystal layer 140 may reflect or scatter light. The cholesteric liquid crystal of the liquid crystal layer 140 may be switched between the focal conic state and the planer state. Meanwhile, when a sufficient electric field is applied to the liquid crystal layer 140, the cholesteric liquid crystal may be switched to the homeotropic state in which light can be transmitted.

The planer state refers to a state in which the helical axis of the cholesteric liquid crystal is arranged substantially perpendicular to a front surface of the display element 110, and the focal conic state refers to a state in which the helical axis of the cholesteric liquid crystal is arranged substantially parallel to the front surface of the display element 110.

For example, when a voltage is applied to the cholesteric liquid crystal in the planer state, the helical axis that was perpendicular to the front surface of the display element 110 is changed to be parallel to the display element 110. Thus, the texture of the cholesteric liquid crystal is switched to the focal conic state.

When a higher voltage is applied to the cholesteric liquid crystal in the focal conic state, the helical structure is disassembled, and thus the liquid crystal layer 140 becomes the homeotropic state in which liquid crystal molecules are arranged in the direction of the electric field. In this case, the liquid crystal layer 140 may return to the focal conic state when the electric field is gradually removed and may return to the planer state when the electric field is drastically removed.

Each state of the liquid crystal layer 140 will be described with reference to FIGS. 6 to 8.

Figure 6:
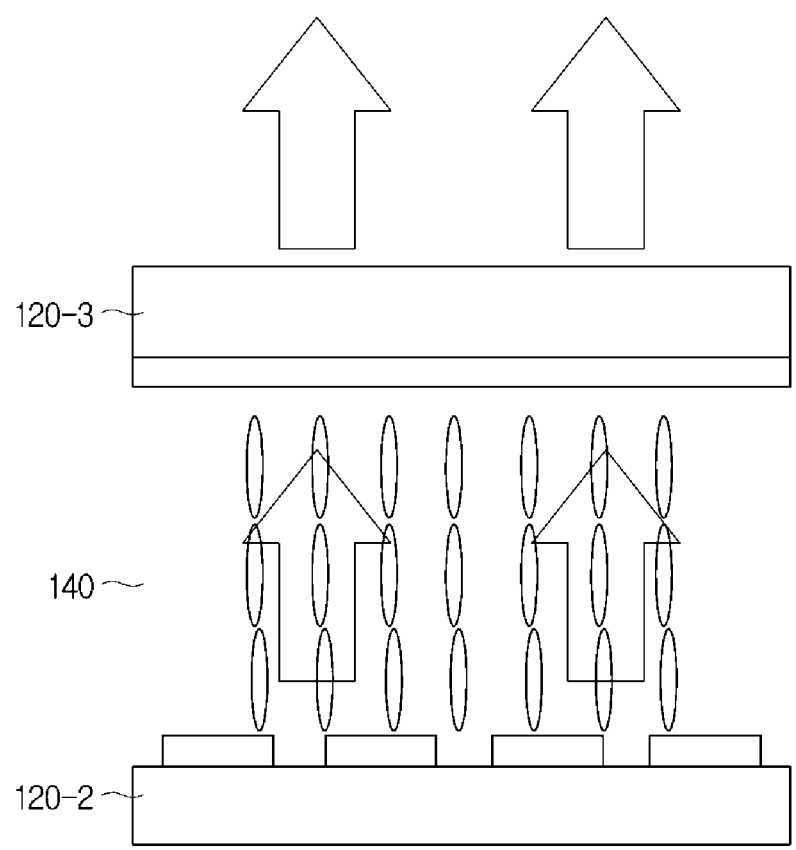
FIG. 6 is a view showing an arrangement of liquid crystals in the homeotropic state.

FIG. 6 is a view showing an arrangement of liquid crystals in the homeotropic state.

The arrangement of the liquid crystals in the homeotropic state is a liquid crystal arrangement that is achieved when a high electric field is applied to the liquid crystal layer 140, and thus has light transmission properties.

Figure 7:
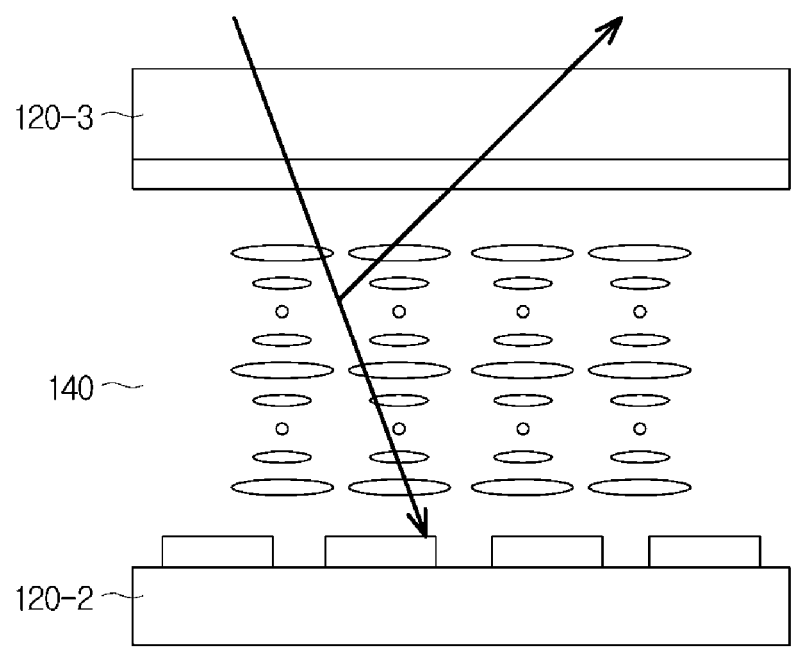
FIG. 7 is a view showing an arrangement of liquid crystals in the planer state.

FIG. 7 is a view showing an arrangement of liquid crystals in the planer state.

The arrangement of the liquid crystals in the planer state is a liquid crystal arrangement that is generated when the high electric field applied to the liquid crystals in the homeotropic state is drastically lowered. In the planer state, all helical structural axes are perpendicular to the surface of the display element 110.

In this case, when the degree of twist of the helical structure is adjusted, that is, when a pitch length is adjusted, the liquid crystal layer 140 may be provided to reflect light having different wavelength ranges such as red, green, or blue.

In detail, when the pitch length of the helical structure of the cholesteric liquid crystal is adjusted, the wavelength range of the reflected light may be determined. Thus, it is possible to adjust color of the reflected light by adjusting the helical pitch of the cholesteric liquid crystal.

Figure 8:
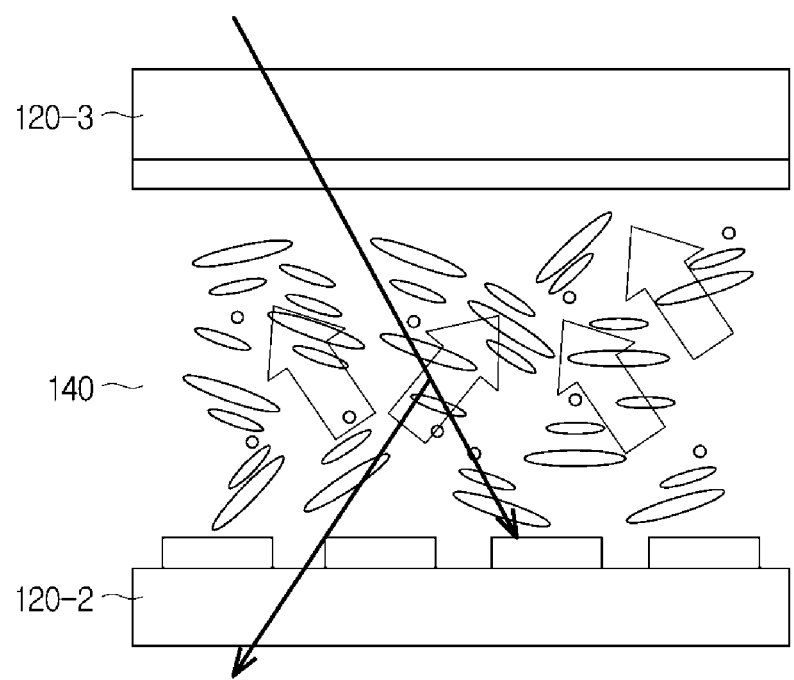
FIG. 8 is a view showing an arrangement of liquid crystals in the focal conic state.

FIG. 8 is a view showing an arrangement of liquid crystals in the focal conic state.

The arrangement of the liquid crystals in the focal conic state is an arrangement generated when the high electric field applied to the liquid crystal in the homeotropic state is slowly lowered, and has light scattering properties.

In the focal conic state, the helical structure may be irregular, but the liquid crystals are transparent. Accordingly, light can pass through the liquid crystals.

The transparency adjustment layer 130 may be provided to implement the display element 110 to be transparent or opaque. When no electric field is applied to the transparency adjustment layer 130, the transparency adjustment layer 130 may operate in an opaque mode. In this case, color may be more clearly implemented by light reflected by the liquid crystal layer 140 of the display element 110. When an electric field is applied to the transparency adjustment layer 130, the transparency adjustment layer 130 may operate in a transparent mode. In this case, the display element 110 may be implemented in a transparent state.

The transparency adjustment layer 130 may include a black dye and a cholesteric liquid crystal. The black dye may be disposed to form a helical structure along with the cholesteric liquid crystal molecule.

The cholesteric liquid crystal molecule and the black dye are formed by repeating a molecular twist at regular intervals. In this case, light may be selectively reflected depending on a formed pitch. More specifically, when the pitch is formed to be long, infrared light is reflected, and visible light may be transmitted into the transparency adjustment layer 130. The visible light may be transmitted into the transparency adjustment layer 130 and absorbed by the black dye. As a result, the transparency adjustment layer 130 may be implemented in the opaque mode. Meanwhile, the transparency of the transparency adjustment layer 130 may be determined depending on the degree to which visible light is absorbed by the black dye. The degree to which visible light is absorbed by the black dye may vary depending on the twist structure of the cholesteric liquid crystal and the black dye.

Figure 9:
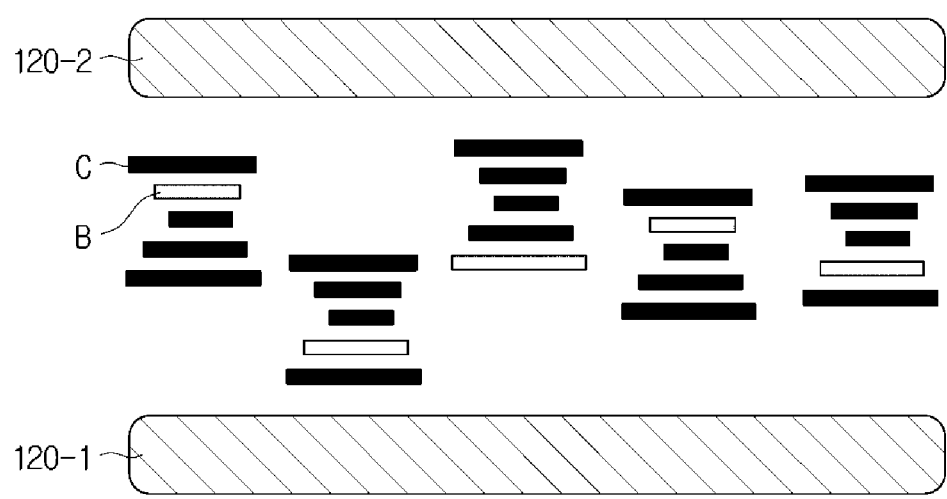
FIG. 9 is an enlarged view of the opaque mode of the transparency adjustment layer of the display element according to an embodiment.
Figure 10:
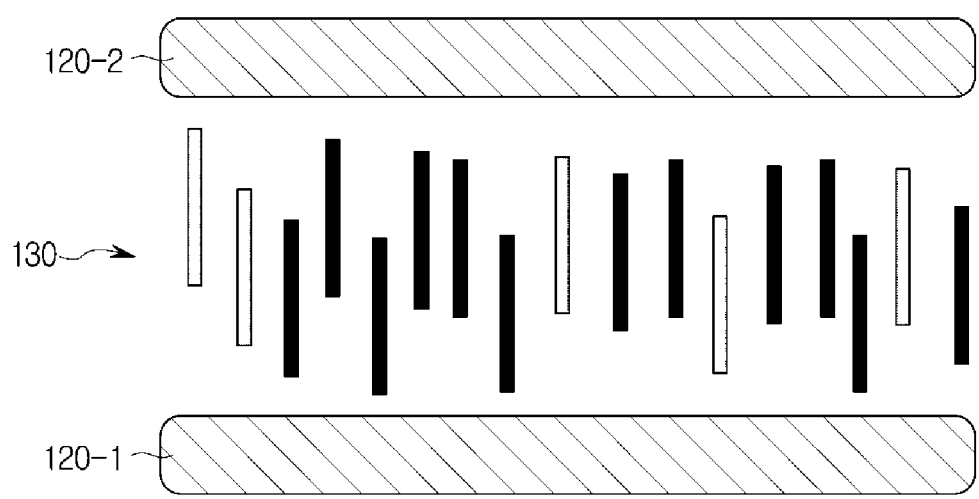
FIG. 10 is an enlarged view of the transparent mode of the transparency adjustment layer of the display element according to an embodiment.

FIG. 9 is an enlarged view of the opaque mode of the transparency adjustment layer 130 of the display element 110 according to an embodiment, and FIG. 10 is an enlarged view of the transparent mode of the transparency adjustment layer 130 of the display element 110 according to an embodiment.

Referring to FIG. 9, when no electric field is applied to the transparency adjustment layer 130, a cholesteric liquid crystal molecule C and a black dye B may form a texture structure in the planer state. That is, the cholesteric liquid crystal molecule C and the black dye B may be formed by repeating a molecular twist at regular intervals. In this case, a twist structure formed the black dye B and the cholesteric liquid crystal molecule C may have a longer pitch length than the twist structure formed by the cholesteric liquid crystal molecule shown in FIG. 5.

In detail, the black dye B and the cholesteric liquid crystal molecule C may form a twist structure to reflect infrared light. In this case, when light is incident on the transparency adjustment layer 130, infrared light may be reflected by the surface, and visible light may be transmitted into the transparency adjustment layer 130. When visible light is transmitted, red-based, green-based, and blue-based light included in the transmitted visible light are absorbed by the black dye B provided in the twist structure. As a result, the display element 110 may be implemented in the opaque mode.

Referring to FIG. 10, when an electric field is applied to the transparency adjustment layer 130, the cholesteric liquid crystal molecule C and the black dye B may form a texture structure in the homeotropic state. That is, the twist structure of the cholesteric liquid crystal molecule C and the black dye B may be disassembled.

In this case, when light is incident on the transparency adjustment layer 130, visible light is transmitted into the transparency adjustment layer 130, and red-based light, green-based light, and blue-based light included in the transmitted visible light are absorbed by the black dye B provided in the twist structure. However, when the molecules are arranged in the homeotropic state, only a small amount of visible light is absorbed by the black dye B. As a result, the display element 110 may be implemented in the transparent mode.

Depending on the embodiment, the display element 110 may include a touch panel 155 and a front light panel 160. The touch panel 155, which is a layer provided to receive a user's touch, may be disposed adjacent to the third substrate 120-3. The front light panel 160, which is a layer provided for the case in which external brightness is low, may be disposed adjacent to the touch panel 155. Depending on the embodiment, it will be appreciated that the display element 110 may not include the touch panel 155 and the front light panel 160.

Subsequently, an embodiment of the smart window system will be described below.

The display element 110 of the smart window system according to an aspect may receive a control command for controlling a state of the display element 110 from an input device and enable the state of the display element 110 to be controlled. Depending on the embodiment, the state of the display element 110 may be controlled on the basis of sensor value information collected by a sensor unit 260.

The display element 110 may have a state controlled on the basis of a control command entered from a mobile device such as a smart phone. The state of the display element 110 may be controlled on the basis of a control command entered from an AVN device or a vehicle operating unit installed in the vehicle 10 and may be controlled on the basis of sensor value information collected by sensors provided in the vehicle 10. Depending on the embodiment, a screen of the mobile device may be mirrored and displayed on an AVN screen of the vehicle 10. In this case, the user may enter a control command through the mobile device or the AVN device.

The state of the display element 110 may be controlled according to a control command determined by a display element controller or may be controlled according to a control command determined by a controller other than the display element controller. Here, the controller other than the display element controller may be a controller of the input device or a controller of the vehicle 10 in which a smart window system is installed.

Embodiments of the smart window system will be described in detail with reference to the accompanying drawings.

FIG. 11 is a control block diagram of a smart window system including a mobile device 200 and a smart window device 100, FIG. 12 is a control block diagram of a smart window system including an AVN device 220 and the smart window device 100, FIG. 13 is a control block diagram of a smart window system including a vehicle operating unit 240 and the smart window device 100, and FIG. 14 is a control block diagram of a smart window system including a sensor unit 260 and the smart window device 100.

Figure 11A:
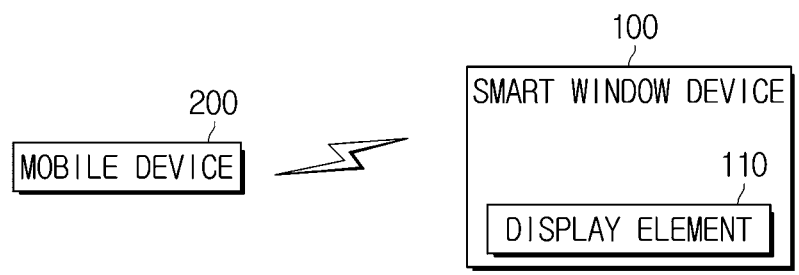
FIGS. 11A, 11B and 11C are control block diagrams of a smart window system including a mobile device 200 and a smart window device 100.
Figure 11B:
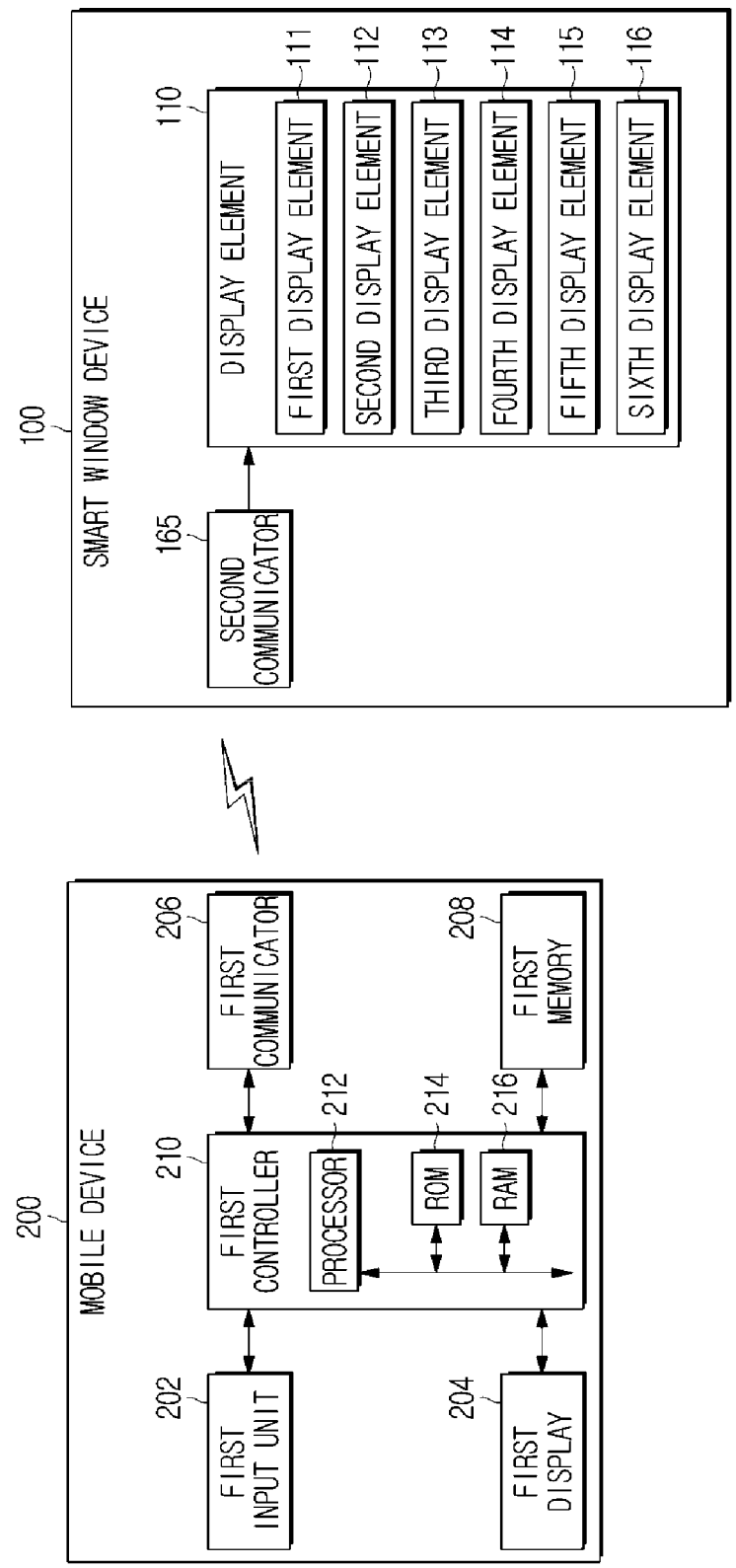
Figure 11C:
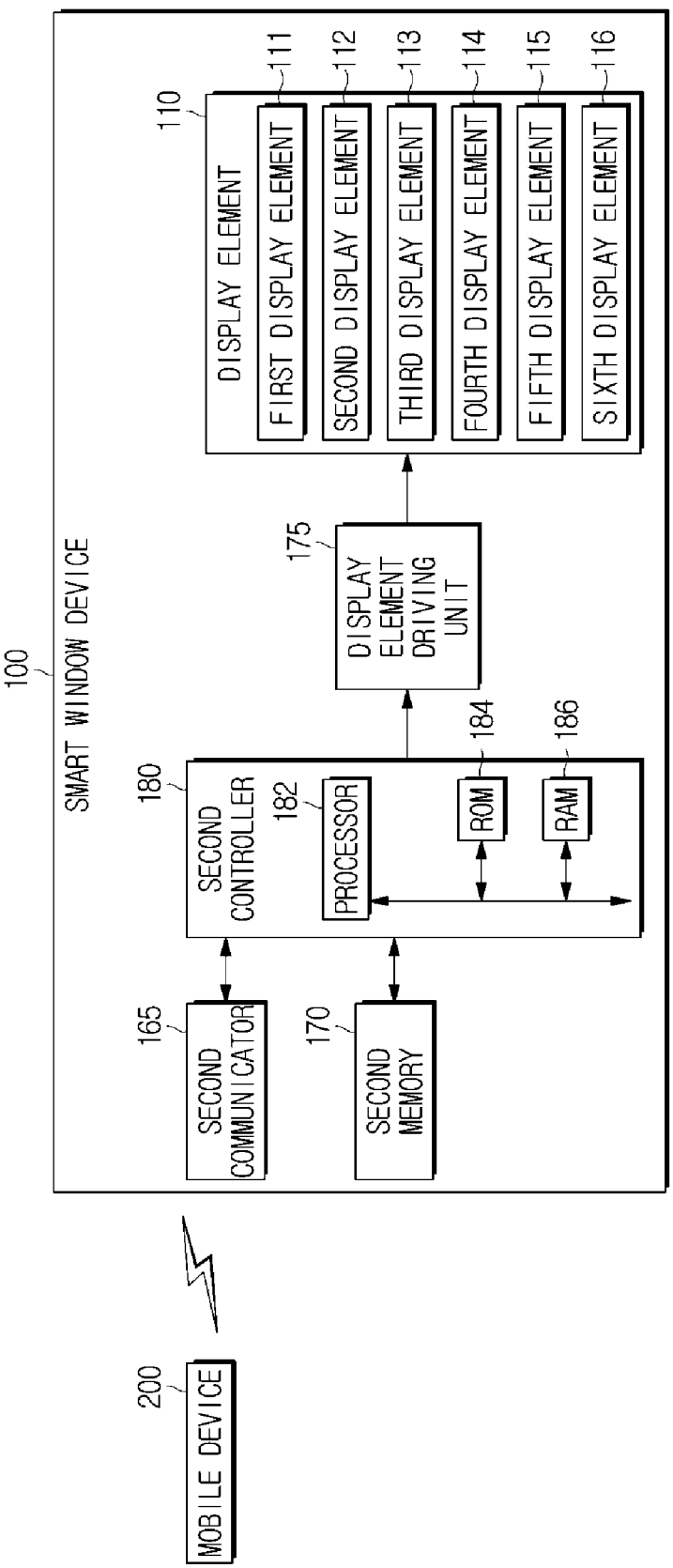

Referring to FIGS. 11A to 11C, the smart window system according to an embodiment may include the mobile device 200 and a display element 110 of the smart window device 100. The transparency of the display element 110 may be controlled on the basis of a control command entered from the mobile device 200.

The display element 110 may include a plurality of display elements 110, and each of the display elements 110 may have a state adjusted according to the control command entered from the mobile device 200. An example in which the display element 110 includes first to sixth display elements 111, 112, 113, 114, 115, and 116 will be described below. Here, the first display element 111 may be a front glass 12 of a vehicle 10, the second to fifth display elements 112, 113, 114, and 115 may be side glasses of the vehicle 10, and the sixth display element 116 may be a rear glass 13 of the vehicle 10.

The display element 110 may have a state controlled according to power applied to the display element 110. The state of the display element 110 may refer to at least one of transparency, color, pattern, and gradation of the display element 110 and information displayed on the display element 110.

According to an example, the display element 110 may be implemented in a transparent mode when an electric field is applied to a transparency adjustment layer 130 of the display element 110 and may be implemented in an opaque mode when no electric field is applied to the transparency adjustment layer 130. At the same time, the display element 110 may implement color by reflecting visible light having a specific wavelength range when an electric field is applied to a liquid crystal layer 140, and may be implemented in the transparent mode by transmitting visible light having all wavelength ranges when no electric field is applied to the liquid crystal layer 140. When an electric field is applied to the liquid crystal layer 140, the wavelength range of reflected visible light may be determined by a twist structure of a cholesteric liquid crystal molecule C included in the liquid crystal layer 140, as described above.

The first to sixth display elements 111, 112, 113, 114, 115, and 116 may be independently controlled. By selecting a display element 110 to be controlled through the mobile device 200, the user may allow the display element 110 to be independently controlled. For example, in association with transparency adjustment for the glasses of the vehicle 10, transparency of the second to sixth display elements 112, 113, 114, 115, and 116 may be adjusted according to input of the mobile device 200. However, in order not to disturb a driver's view, transparency of the first display element 111 may not be adjusted separately from the second to sixth display elements 112, 113, 114, 115, and 116.

As shown in FIG. 11B, the transparency of the display element 110 may be controlled according to a command determined by a controller 210 of the mobile device 200. Depending on the embodiment, as shown in FIG. 11C, the transparency of the display element 110 may be controlled according to a control command determined by a controller 180 of the smart window device 100.

Referring to FIG. 11B, the mobile device 200 may include an input unit 202, a display 204, a communicator 206, a memory 208, and the controller 210, and the smart window device 100 may include a communicator 165 and the display element 110. In order to distinguish the elements of the mobile device 200 from elements of another device such as the smart window device 100, the input unit, the display, the communicator, the memory, and the controller of the mobile device 200 are referred to as a first input unit 202, a first display 204, a first communicator 206, a first memory 208, and a first controller 210, respectively. In order to distinguish the elements of the smart window device 100 from elements of other devices, the communicator of the smart device is referred to as a second communicator 165.

The first input unit 202 may receive a control command for the display element 110 from the user. The first input unit 202 may employ a hard key scheme, a proximity sensor scheme, or a graphic user interface (GUI) scheme such as a touch pad in order to receive the user's input. When the first input unit 202 employs the GUI scheme such as a touch pad, the first input unit 202 may be implemented in the form of a touch screen panel and may be provided integrally with the first display 204.

The first display 204 may provide a display screen for displaying a control screen for the display element 110. The display screen will be described below in the related section.

The first display 204 may be provided as a cathode ray tube (CRT), a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel, an organic light emitting diode (OLED) panel, or the like, but is not limited thereto.

The first memory 208 may store various types of data, programs, or applications for driving and controlling the mobile device 200 under control of the first controller 210.

The first memory 208 may store information regarding an input signal corresponding to the driving of the mobile device 200 and state information of the display element 110 corresponding to the input signal. More specifically, the first memory 208 may store the state information of the display element 110 corresponding to a control command of the display element 110 received from the first input unit 202 of the mobile device 200.

The first memory 208 may store information regarding control programs for controlling the smart window device 100, dedicated applications initially provided by a manufacturer, or general-purpose applications downloaded from the outside and may store a user interface (UI) associated with the applications, an object (e.g., an image, text, icon, or button) for providing the UI, user information, or relevant data.

The first memory 208 may also include a read-only memory (ROM) 214 and a random access memory (RAM) 216 of the first controller 210. The first memory 208 may include a nonvolatile memory, a volatile memory, a hard disk drive (HDD), a solid state drive (SSD), or the like.

The first communicator 206 may connect the mobile device 200 to the smart window device 100 under control of the first controller 210. The first communicator 206 may deliver a control command of the user entered through the input unit to the smart window device 100. Here, the control command delivered to the smart window device 100 through the first communicator 206 may be processed by the first controller 210, which will be described below.

The first communicator 206 may include at least one of a wired Ethernet unit, a wireless local area network (WLAN) unit, and a short-range communicator, and the short-range communicator may include a Bluetooth unit, a Bluetooth Low Energy (BLE) unit, an Infrared Data Association (IrDA) unit, a wireless fidelity (Wi-Fi) unit, an Ultra-WideBand (UWB) unit, a Near Field Communication (NFC) unit, and the like.

The first controller 210 may include a processor 212, a ROM 214 configured to store a control program for controlling the mobile device 200, and a RAM 216 configured to store a signal or data entered from the outside of the mobile device 200 or used as a storage area corresponding to various tasks performed by the mobile device 200.

The first controller 210 may control the overall operation of the mobile device 200 and control signal flow between internal elements of the mobile device 200 and may function to process data. When a control command for the display element 110 is entered from the user, the first controller 210 may execute an operating system and various applications stored in the first memory 208.

The processor 212 may include a graphic processing unit (GPU) for performing graphical processing of an image or video. The first controller 210 may include a graphic processing board having the GPU, the RAM 216, and the ROM 214 on a separate circuit board that is electrically connected to the first controller 210.

The first controller 210 may determine the transparency of the display element 110 on the basis of an input command entered through the first input unit 202 and may control the first communicator 206 so that the transparency is delivered to the smart window device 100.

The second communicator 165 of the smart window device 100 may receive a control command for controlling the display element 110 from the first communicator 206 and deliver the received control command to the display element 110. The transparency of the display element 110 may be controlled according to the control command received from the first communicator 206.

As shown in FIG. 11C, the transparency of the smart window device 100 may be controlled according to a control command determined by the controller 180 of the smart window device 100. More specifically, the smart window device 100 may include a communicator 165, a memory 170, a display element driving unit 175, a display element 110, and a controller 180. Hereinafter, in order to distinguish the elements of the smart window device 100 from other elements, the communicator, the memory, and the controller of the smart window device 100 are referred to as a second communicator 165, a second memory 170, and a second controller 180, respectively. Also, the foregoing description of the elements of the mobile device 200 that are associated with the second communicator 165, the second memory 170, and the second controller 180 will be omitted.

The second communicator 165 may connect the smart window device 100 and the mobile device 200 through the first communicator 206 of the mobile device 200 under control of the second controller 180. The second communicator 165 may receive data entered by the user through the first input unit 202 of the mobile device 200 from the first communicator 206 of the mobile device 200, and the second controller 180 may determine the transparency of the display element 110 on the basis of the data received through the second communicator 165.

The second controller 180 may include a processor 182, a ROM 184 configured to store a control program for controlling the smart window device 100, and a RAM 186 configured to store a signal or data entered from the outside of the smart window device 100 or used as storage areas corresponding to various tasks performed by the smart window device 100.

The second controller 180 may control the overall operation of the smart window device 100 and control signal flow between internal elements of the smart window device 100 and may function to process data. Also, when a control command for the display element 110 is entered from the user, the second controller 180 may execute an operating system and various applications stored in the memory.

When the transparency of the display element 110 is determined on the basis of data delivered from the mobile device 200, the second controller 180 may deliver the transparency to the display element driving unit 175, and the display element driving unit 175 may control the transparency of the display element 110 by adjusting power applied to the display element 110.

Figure 12A:
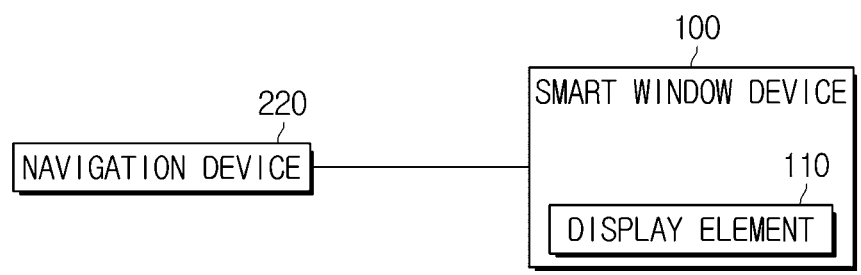
FIGS. 12A, 12B and 12C are control block diagrams of a smart window system including an AVN device 220 and the smart window device 100.

Subsequently, referring to FIGS. 12A and 12B, a smart window system according to another embodiment may include an AVN device 220 and a display element 110 of the smart window device 100. The transparency of the display element 110 may be controlled on the basis of a control command for the display element 110 entered through the AVN device 220. Depending on the embodiment, a display screen of the mobile device 200 may be mirrored and displayed on the AVN screen of the AVN device 220. In this case, the transparency of the display element may be controlled on the basis of a control command received through the display screen of the mobile device 200 or the AVN device 220.

Figure 12B:
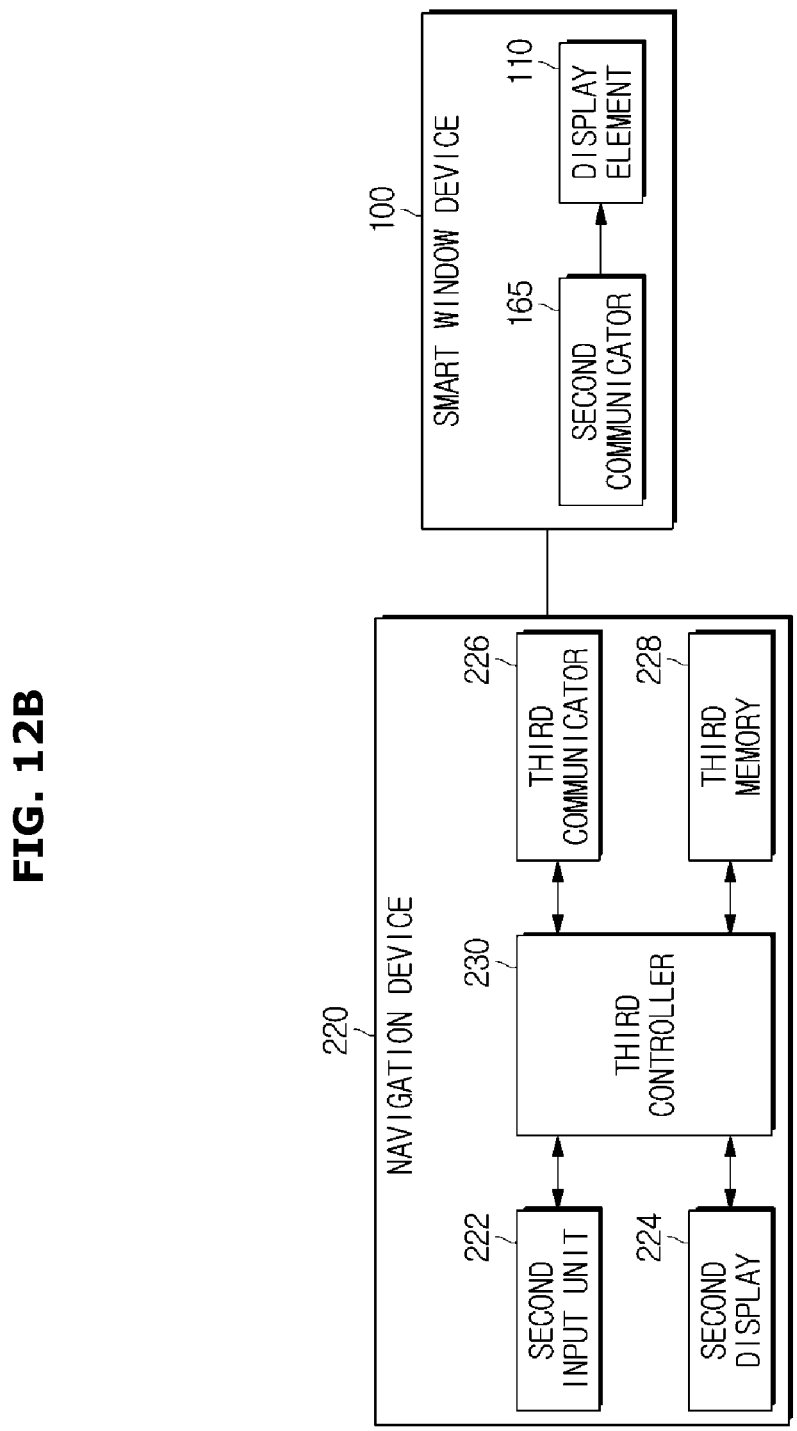
Figure 12C:
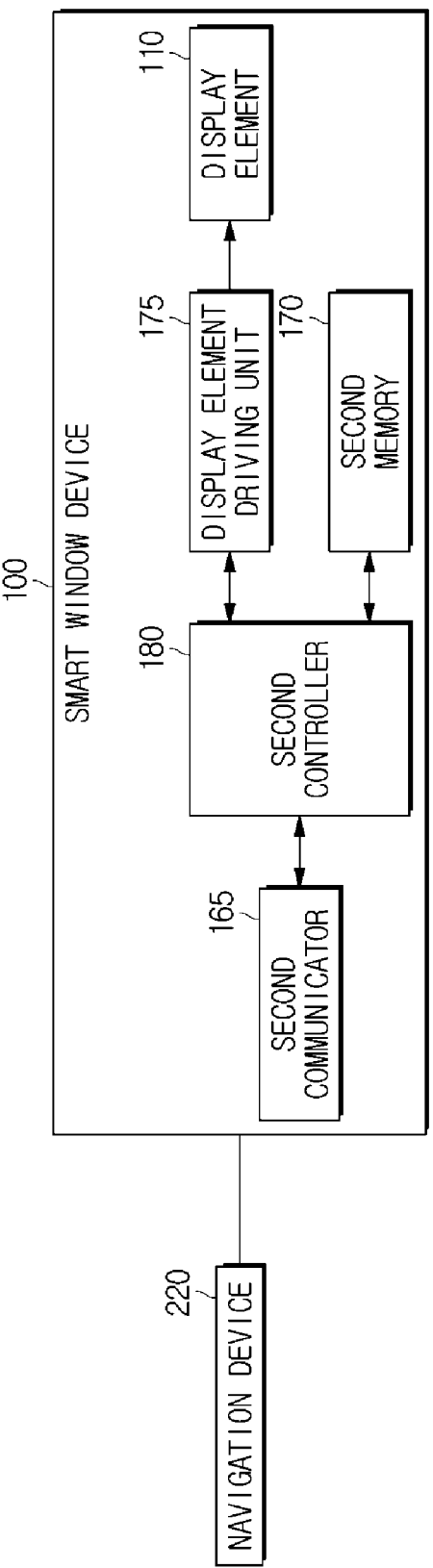

As shown in FIG. 12B, the transparency of the display element 110 may be controlled according to a command determined by a controller 230 of the AVN device 220. Depending on the embodiment, as shown in FIG. 12C, the transparency may be controlled according to a control command determined by a controller 180 of the smart window device 100.

Referring to FIG. 12B, the AVN device 220 may include an input unit 222, a display 224, a communicator 226, a memory 228, and the controller 230, and the smart window device 100 may include a communicator 165 and the display element 110. In order to distinguish the elements of the AVN device 220 from elements of other devices, the input unit 222, the display 224, the communicator 226, the memory 228, and the controller 230 of the AVN device 220 are referred to as a second input unit 222, a second display 224, a third communicator 226, a third memory 228, and a third controller 230, respectively, and the communicator 165 of the smart window device 100 is referred to as a second communicator 165.

The second input unit 222 of the AVN device 220 may receive a control command for the display element 110 from the user, and the second display 224 may display a control screen for the display element 110. A second memory 170 may store a control program, an application, or the like for processing a control command of the user entered from the second input unit 222. The third controller 230 may determine the transparency of the display element 110 on the basis of the control command input through the second input unit 222 and may control the third communicator so that the transparency is delivered to the smart window device 100.

The second communicator 165 of the smart window device 100 may receive a control command for controlling the display element 110 from the third communicator 226 and deliver the received control command to the display element 110. The transparency of the display element 110 may be controlled according to the control command received from the third communicator 226.

Figure 13A:
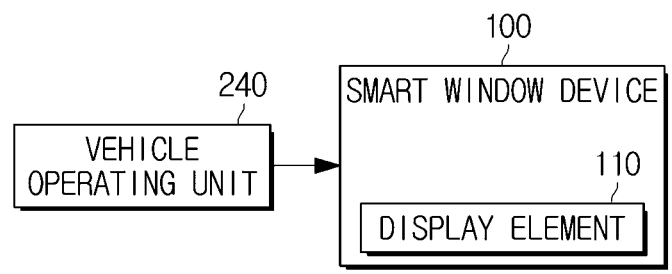
FIGS. 13A, 13B and 13 C are control block diagrams of a smart window system including a vehicle operating unit 240 and the smart window device 100.
Figure 13B:
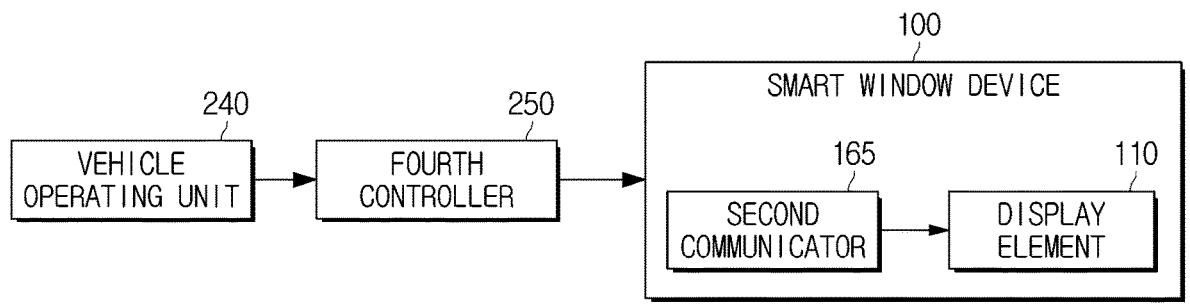
Figure 13C:
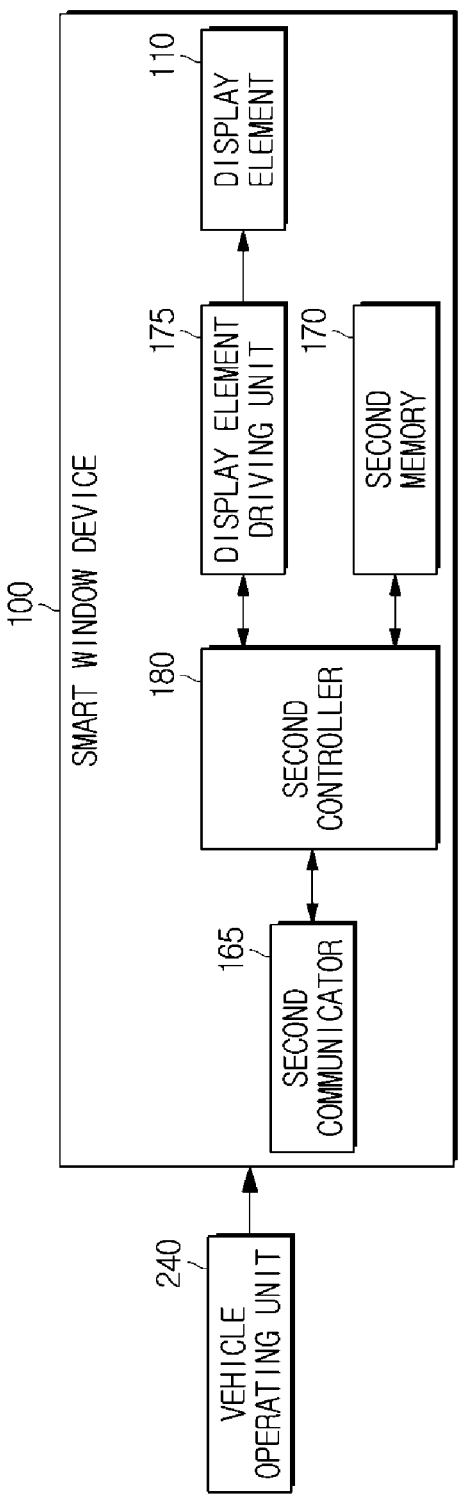

Referring to FIG. 13C, the transparency of the smart window device 100 may be controlled according to a control command determined by the controller 180 of the smart window device 100.

More specifically, the smart window device 100 may include the second communicator 165, the second memory 170, a display element driving unit 175, a display element, and a second controller 180.

The second communicator 165 may connect the smart window device 100 and the AVN device 220 through the third communicator 226 of the AVN device 220 under control of the second controller 180. The second communicator 165 may receive data entered by the user through the second input unit 222 of the AVN device 220 from the third communicator 226 of the AVN device 220, and the second controller 180 may determine the transparency of the display element 110 on the basis of the data received through the third communicator 226.

When the transparency of the display element 110 is determined, the second controller 180 may deliver the transparency to the display element driving unit 175, and the display element driving unit 175 may control the transparency of the display element 110 by adjusting power applied to the display element 110.

Subsequently, referring to FIGS. 13A to 13C, a smart window system according to still another embodiment may include a vehicle operating unit 240 and a display element 110 of the smart window device 100. The vehicle operating unit 240 may include a dial operating unit, a button operating unit, a touch pad, and the like installed in the vehicle 10. However, examples of the vehicle operating unit 240 are not limited thereto. The transparency of the display element 110 may be controlled on the basis of a control command received through the vehicle operating unit 240.

As shown in FIG. 13B, the transparency of the display element 110 may be controlled according to transparency determined by a fourth controller 250 provided outside the smart window device 100. Depending on the embodiment, as shown in FIG. 13C, the transparency may be controlled according to the control command determined by a controller 180 of the smart window device 100.

Referring to FIG. 13B, the vehicle operating unit 240 may receive a control command for the display element 110 from a user and may output the control command to the fourth controller 250. Here, the fourth controller 250 may include a controller of the vehicle 10. The fourth controller 250 may determine the transparency of the display element 110 on the basis of data delivered from the vehicle operating unit 240 and may deliver information regarding the determined transparency to the display element 110.

The transparency of the display element 110 may be controlled according to a control command determined by the fourth controller 250.

Referring to FIG. 12C, the transparency of the smart window device 100 may be controlled according to the control command determined by the controller 180 of the smart window device 100. More specifically, the smart window device 100 may include a second communicator 165, a second memory 170, a display element driving unit 175, a display element, and a second controller 180.

The second communicator 165 may connect the smart window device 100 and the vehicle operating unit 240 under control of the second controller 180. The second communicator 165 may receive input data entered by the user through the vehicle operating unit 240, and the second controller 180 may determine the transparency of the display element 110 on the basis of the data received through the vehicle operating unit 240.

When the transparency of the display element 110 is determined, the second controller 180 may deliver the transparency to the display element driving unit 175, and the display element driving unit 175 may control the transparency of the display element 110 by adjusting power applied to the display element 110.

Figure 14A:
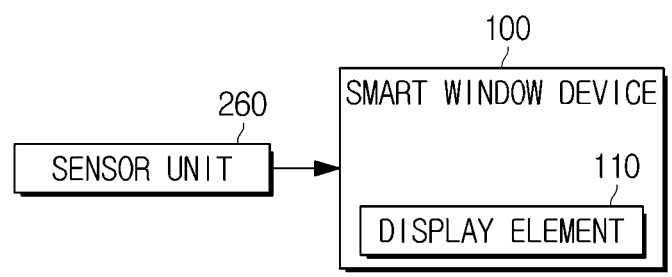
FIGS. 14A, 14B and 14C are control block diagrams of a smart window system including a sensor unit 260 and the smart window device 100.

Subsequently, referring to FIGS. 14A and 14C, a smart window system according to still another embodiment may include a sensor unit 260 and a display element 110 of the smart window device 100. The transparency of the display element 110 may be controlled on the basis of sensor value information collected by the sensor unit 260. Here, the sensor unit 260 may include at least one of an illuminance sensor, a temperature sensor, a distance sensor, a voice sensor, and a gesture sensor, but the type of a sensor providable in the sensor unit 260 is not limited thereto.

Figure 14B:
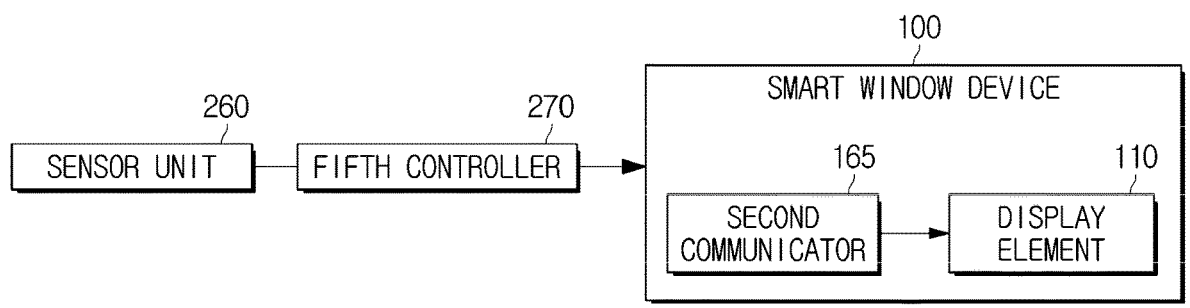
Figure 14C:
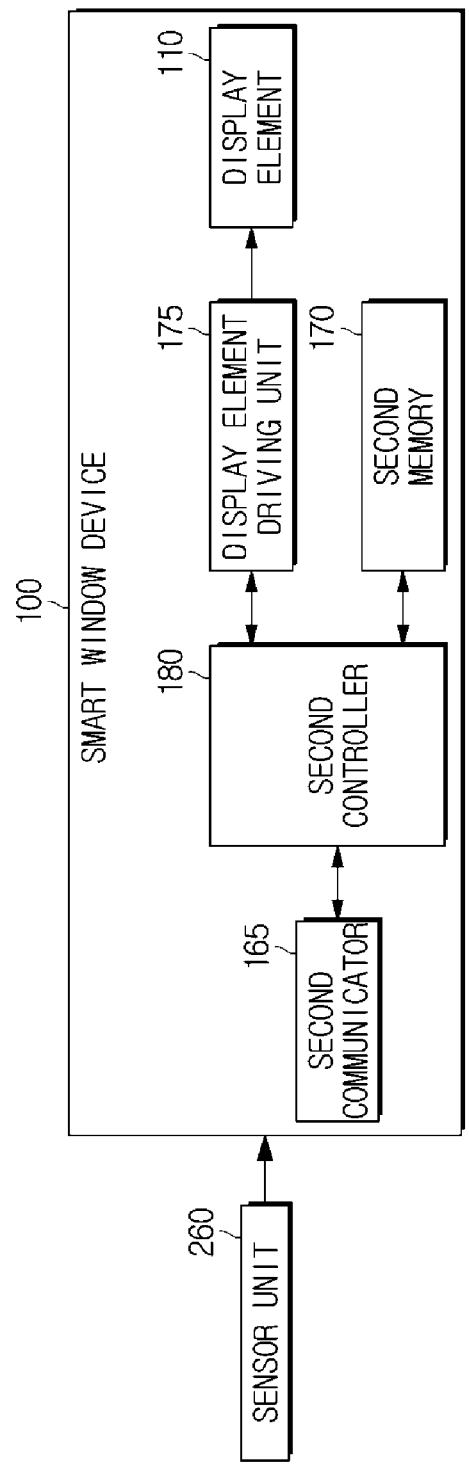

As shown in FIG. 14B, the transparency of the display element 110 may be controlled according to transparency determined by a fifth controller 270 provided outside the smart window device 100. Depending on the embodiment, as shown in FIG. 14C, the transparency may be controlled according to the control command determined by a controller 180 of the smart window device 100.

Referring to FIG. 14B, the sensor unit 260 may collect ambient information at predetermined first intervals and may deliver the collected sensor value information to the fifth controller 270. Here, the fifth controller 270 may be a controller of the vehicle 10.

For example, the illuminance sensor may collect information regarding an external illuminance of the vehicle 10 and may output the collected information to the fifth controller 270. The illuminance sensor may include a CDS sensor or the like, but examples of an available illuminance sensor are not limited thereto.

When the detected result of the illuminance sensor is that the external illuminance of the vehicle 10 is less than or equal to a predetermined first reference illuminance, the color of the display element 110 may be switched to a predetermined first color. Depending on the embodiment, when the external illuminance of the vehicle 10 is more than or equal to the predetermined first reference illuminance, the color of the display element 110 may be switched to a predetermined second color. Depending on the embodiment, the color of the display element 110 may be provided to continuously change according to the illuminance.

The temperature sensor may collect information regarding external or internal temperature of the vehicle 10 and may output the collected information to the fifth controller 270. A thermocouple, a temperature measuring resistor, a thermistor (NTC, PTC, or CTR) and a metallic thermometer may function as the temperature sensor, but examples of an employable temperature sensor are not limited thereto.

When the detected result of the temperature sensor is that the external or internal temperature of the vehicle 10 is lower than or equal to a predetermined first reference temperature, the color of the display element 110 may be switched to a blue color. Depending on the embodiment, when the external or internal temperature of the vehicle 10 is higher than or equal to the predetermined first reference temperature, the color of the display element 110 may be switched to a red color. However, examples of a switchable color are not limited thereto, and the color may be switched to various colors by the user's settings.

The distance sensor may collect information regarding a distance between the vehicle 10 and an object outside the vehicle 10 and may output the collected information to the fifth controller 270. Depending on the embodiment, the distance sensor may collect information regarding a distance between the vehicle 10 and a person approaching the vehicle 10 and may output the collected information to the fifth controller 270. An infrared distance sensor, a natural light distance sensor, and an ultrasonic distance sensor may be employed as the distance sensor, but examples of an employable distance sensor are not limited thereto.

When the detected result of the distance sensor is that an object is approaching the vehicle 10, the color of the display element 110 in an approaching direction of the object may be switched to a red color. Depending on the embodiment, the display element 110 may be controlled to flicker while the color displayed on the display element 110 is switched. Also, when the detected result of the distance sensor is that the object is receding from the vehicle 10, the color or transparency of the display element may be adjusted.

Depending on the embodiment, on the assumption that the vehicle 10 is stopped, when the detected result of the distance sensor is that a pre-registered person is approaching the vehicle 10, the display element 110 may be switched to be transparent. Thus, the approaching person can view the inside of the vehicle 10. On the other hand, when several people are approaching the vehicle 10 and there is an unregistered person among the people, the display element 110 may be switched to be opaque. While whether a person is approaching the vehicle 10 may be detected by the distance sensor, whether a person approaching the vehicle 10 is registered may be detected by a separate face recognition sensor installed therein.

The voice sensor may collect a voice signal of a user and deliver the voice signal to the fifth controller 270. The fifth controller 270 may process the voice signal delivered from the voice sensor to recognize a control command of the user for the display element 110 and may adjust the color, transparency, and the like of the display element 110 according to the recognized voice command.

For example, when a voice command "switch the color of the display element 110 to a red color" is entered from a user, the fifth controller 270 may process a voice signal collected through a processor of the fifth controller 270 to recognize a control command of the user, and the fifth controller 270 may output a control command for switching the color of the display element 110 to a red color to the display element 110 on the basis of the recognized command.

The gesture sensor may collect gesture information of the user and may output the gesture information to the fifth controller 270. The gesture information may be collected by using an image capturing apparatus such as a camera, but a method of collecting the gesture information is not limited thereto. The gesture information of the user may include control command information for the display element 110, and the fifth controller 270 may process the gesture information collected by the gesture sensor to recognize a control command for the display element 110 and may output the control command to the display element 110.

A method of controlling a state of the display element 110 will be described below in detail.

Figure 23:
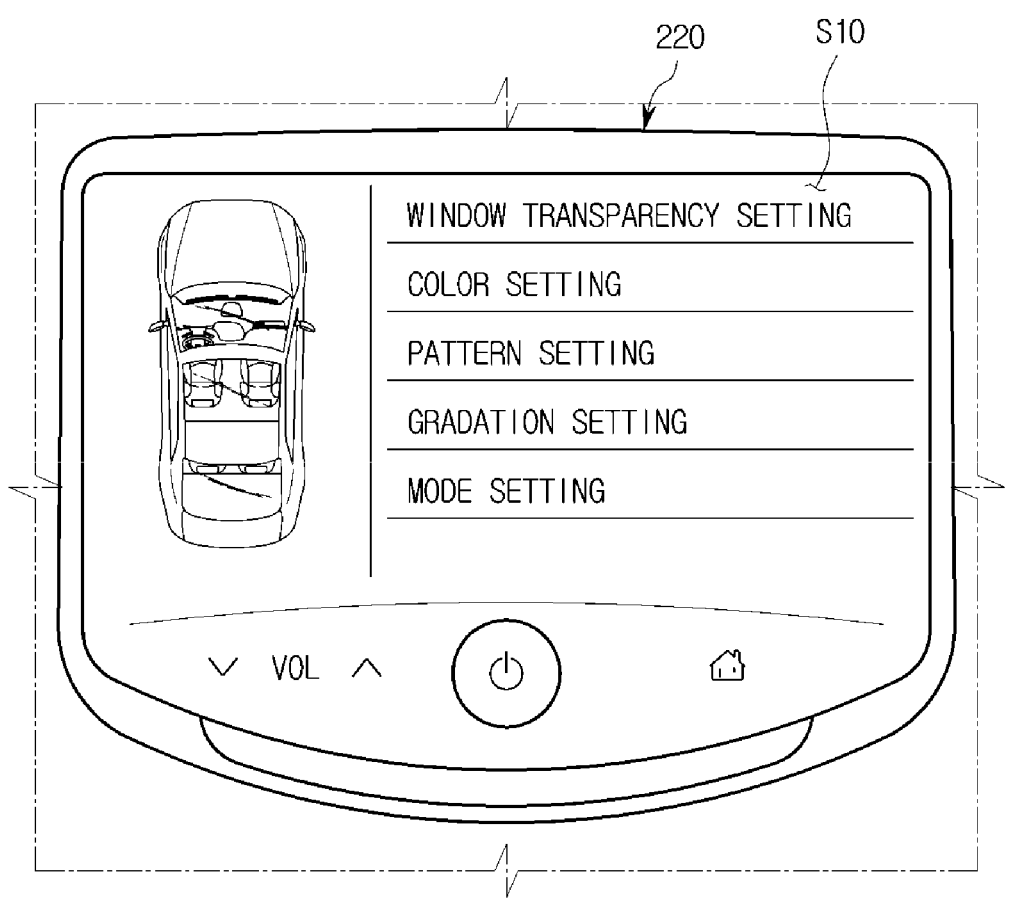
FIG. 23 is a view showing an AVN screen S10 for generally controlling the vehicle windows 12, 13, 20, and 30.
Figure 24:
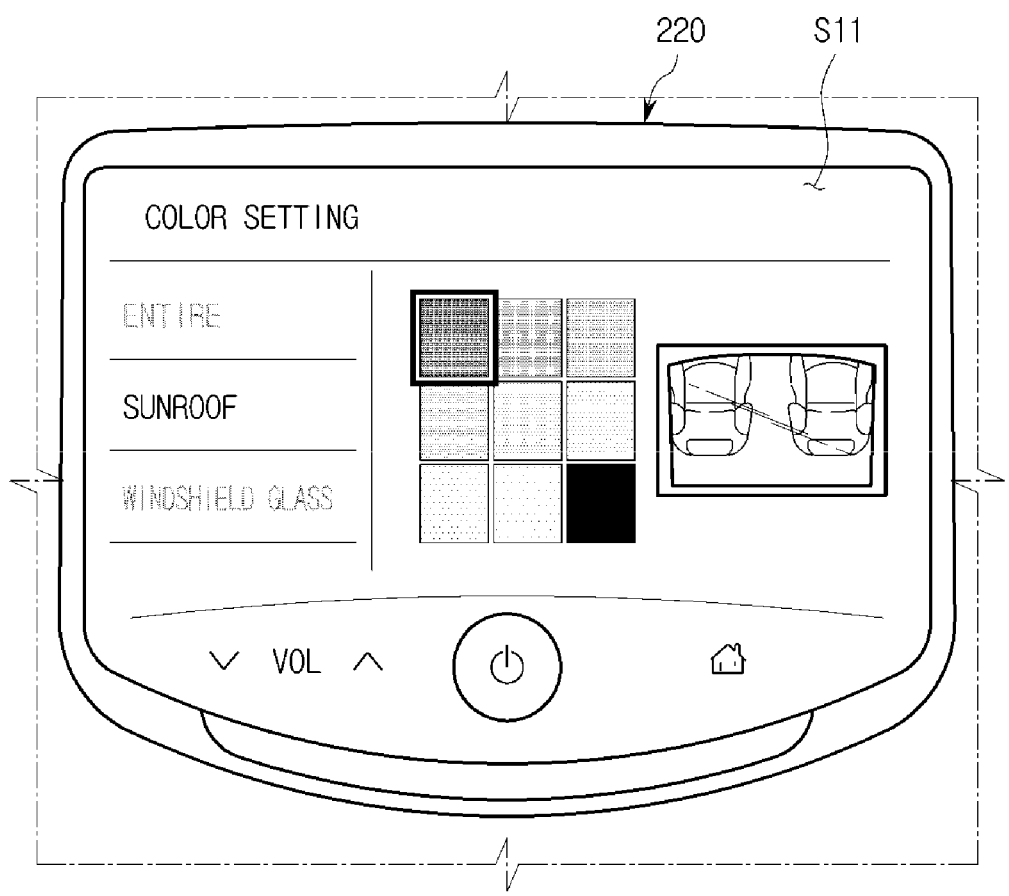
FIG. 24 is a view showing an example of a color setting screen S11 when the color setting button is selected.
Figure 25:
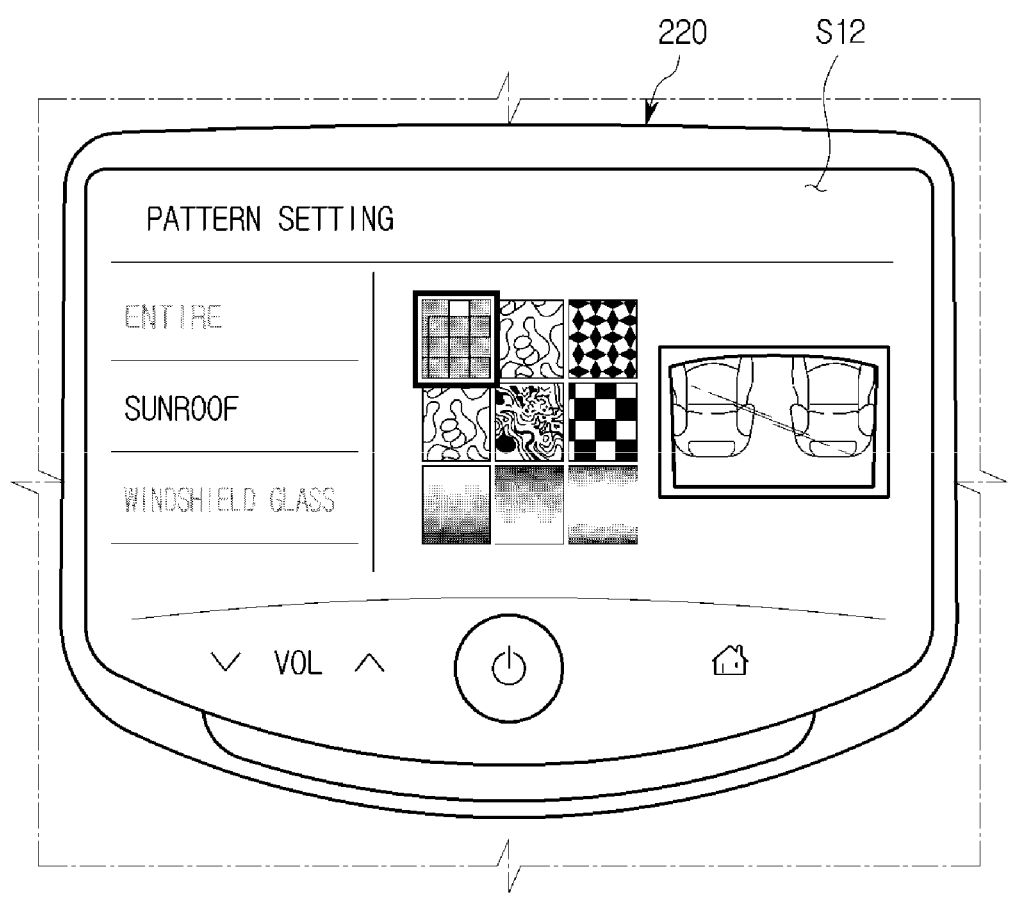
FIG. 25 is a view showing an example of a pattern setting screen S12 when the pattern setting button is selected.

FIGS. 15 to 22 are views showing a method of controlling a state of the display element 110 by means of the mobile device 200, FIGS. 21 to 24 are views showing a method of controlling a state of the display element 110 by means of the AVN device 220, and FIG. 25 is a view showing a method of controlling a state of the display element 110 by means of the dial operating unit 240.

For convenience of description, an example in which the windows 12, 13, and 20 of the vehicle 10 are each provided as the display element 110 according to the disclosed invention will be described. The term "display element 110" and the term "vehicle windows 12, 13, 20, and 30" may refer to the same object.

Figure 15:
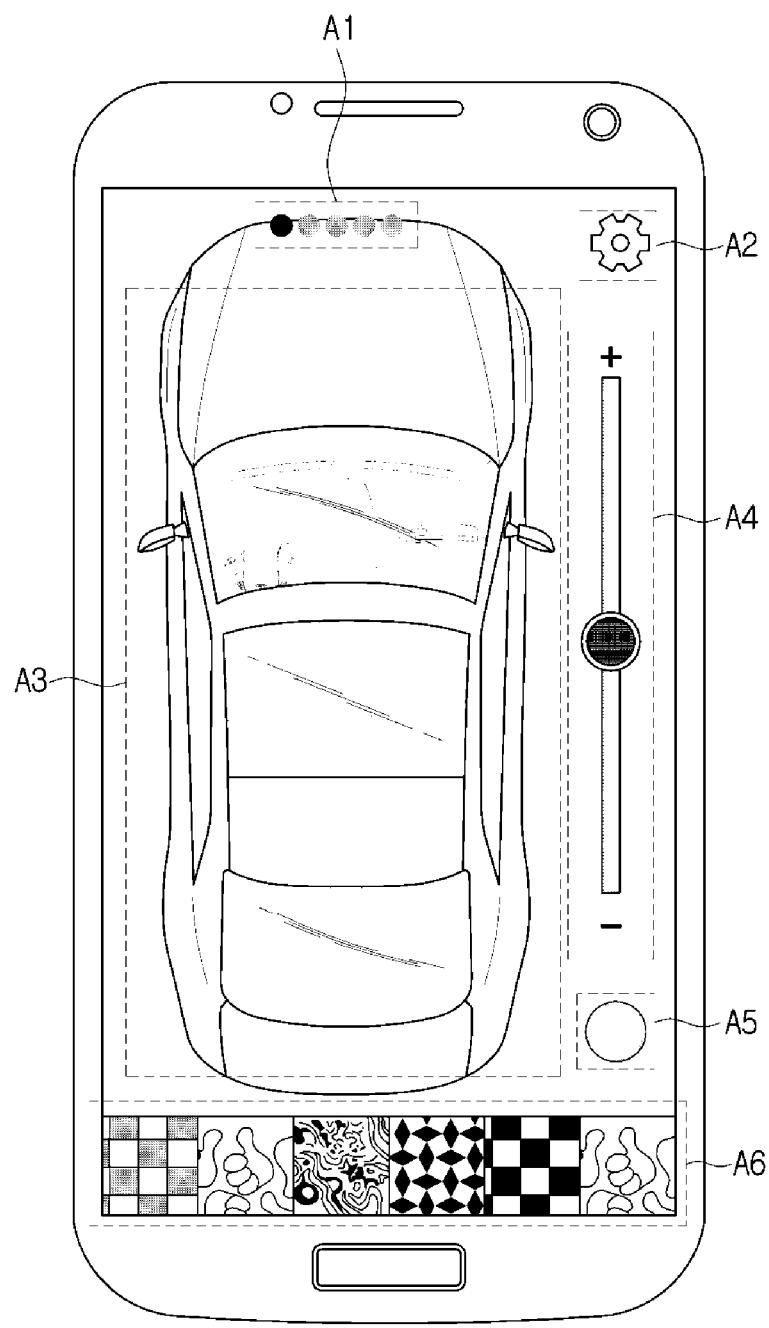
FIG. 15 is a view showing a screen of the mobile device 200 for generally controlling the vehicle windows 12, 13, 20, and 30.

FIG. 15 is a view showing a screen of the mobile device 200 for generally controlling the vehicle windows 12, 13, 20, and 30. Referring to FIG. 13, the screen of the mobile device 200 may be divided into a mode indicator area A1, a mode setting area A2, a vehicle state display area A3, a transparency setting area A4, a color setting area A5, and a pattern setting area A6.

The mode indicator area A1 may display information regarding a current control mode of the display element 110. According to an example, the mode indicator area A1 may display information regarding a privacy mode, a theater mode, a date mode, an automatic mode, and a manual mode, but an example of a displayable control mode of the display element is not limited thereto.

The mode setting area A2 may include a mode setting button. When the mode setting button is clicked, a mode setting screen may be displayed, and an example of a selectable control mode of the display element 110 may be displayed on the mode setting screen.

Figure 16:
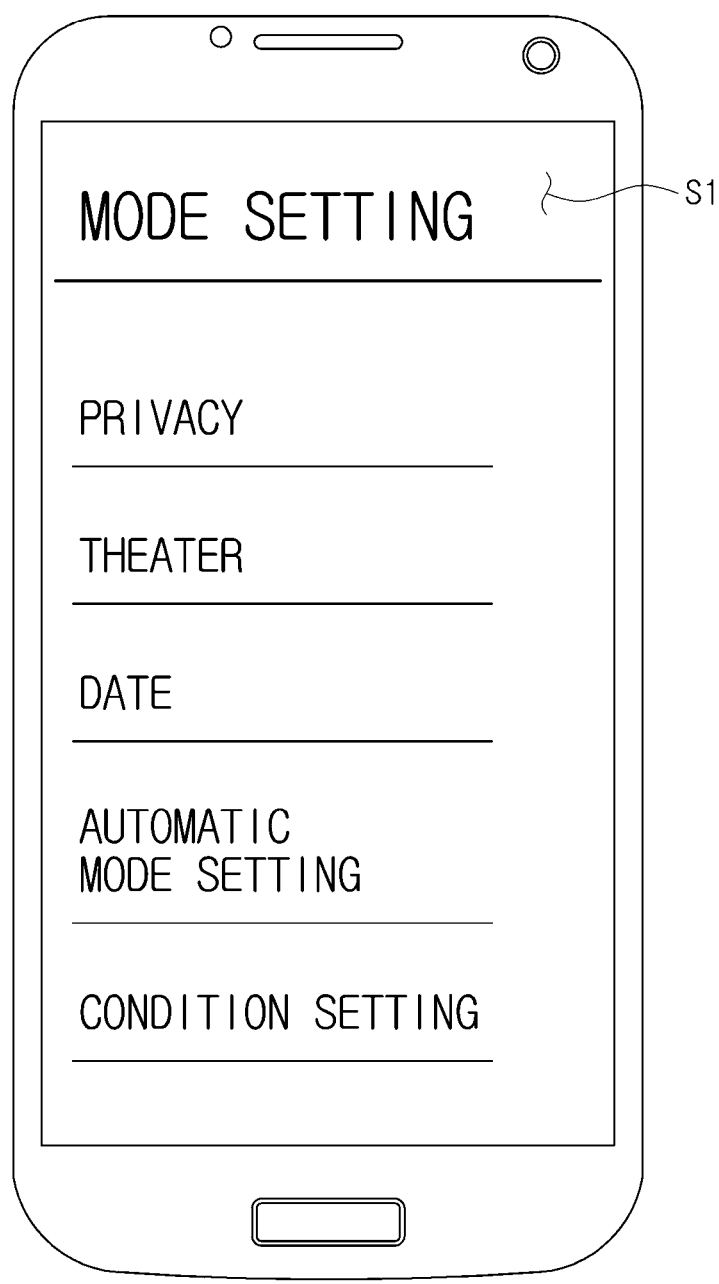
FIG. 16 is a view showing an example of a mode setting screen S1.

FIG. 16 is a view showing an example of a mode setting screen S1.

When a user selects the mode setting button, the mode setting screen S1 may be displayed. In this case, a list of settable control modes of the display element 110 may be displayed on the mode setting screen S1. Depending on the embodiment, a privacy mode setting button, a theater mode setting button, and a date mode setting button may be displayed in the control mode list. Depending on the embodiment, an automatic mode setting button, a condition setting button, and the like may be further displayed.

Figure 17:
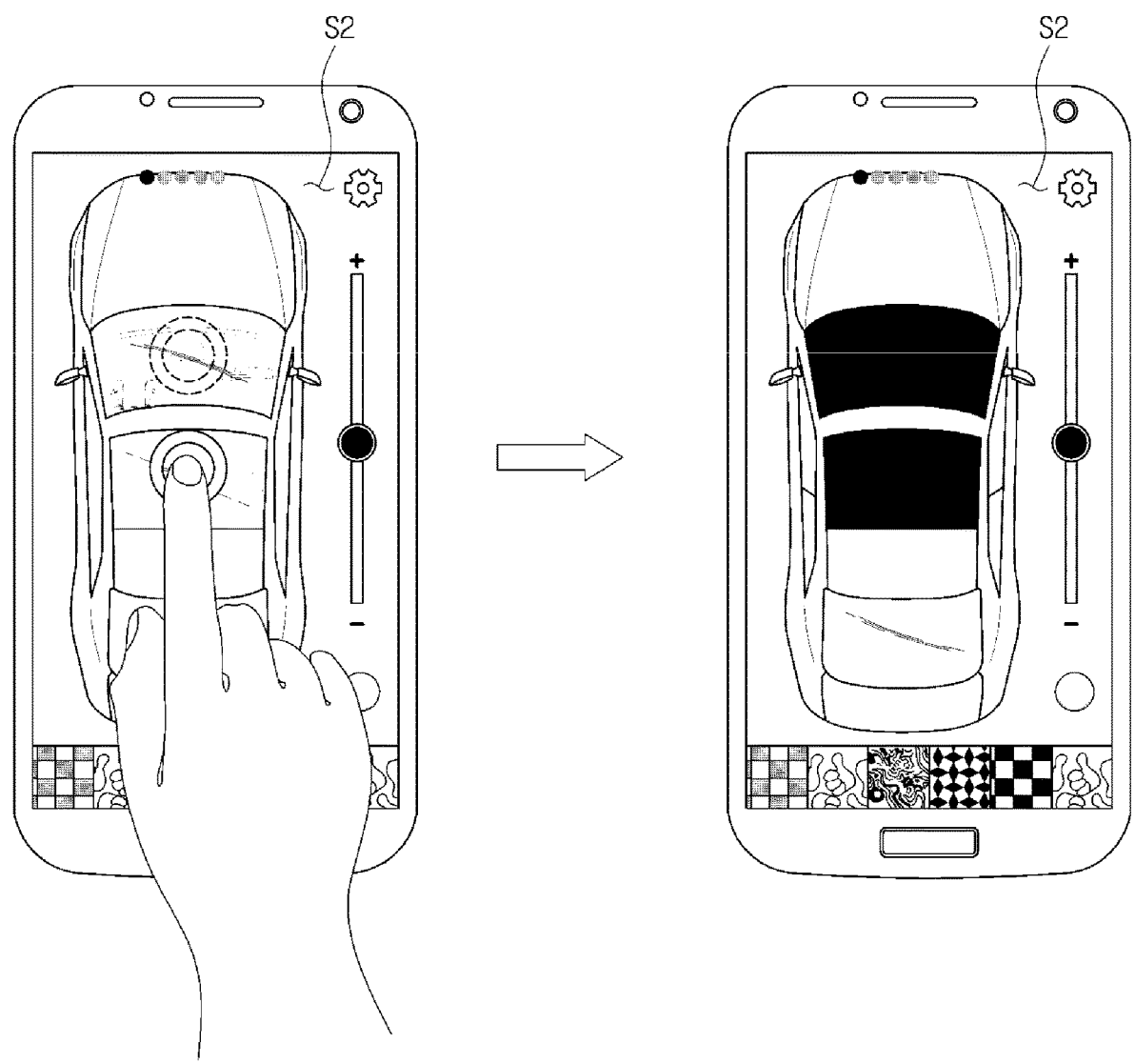
FIG. 17 is a view showing a privacy mode setting screen S2 when the privacy mode button is selected from the mode setting screen S1.

FIG. 17 is a view showing a privacy mode setting screen S2 when the privacy mode button is selected from the mode setting screen S1.

Referring to FIG. 17, the shape of the vehicle 10 may be displayed on the privacy mode setting screen S2. However, depending on the embodiment, a transparency setting bar, a color picker bar, a pattern setting bar, or the like may be further displayed. A user may select a window to be set to a privacy mode, and the selected window may be switched to the privacy mode.

Figure 18:
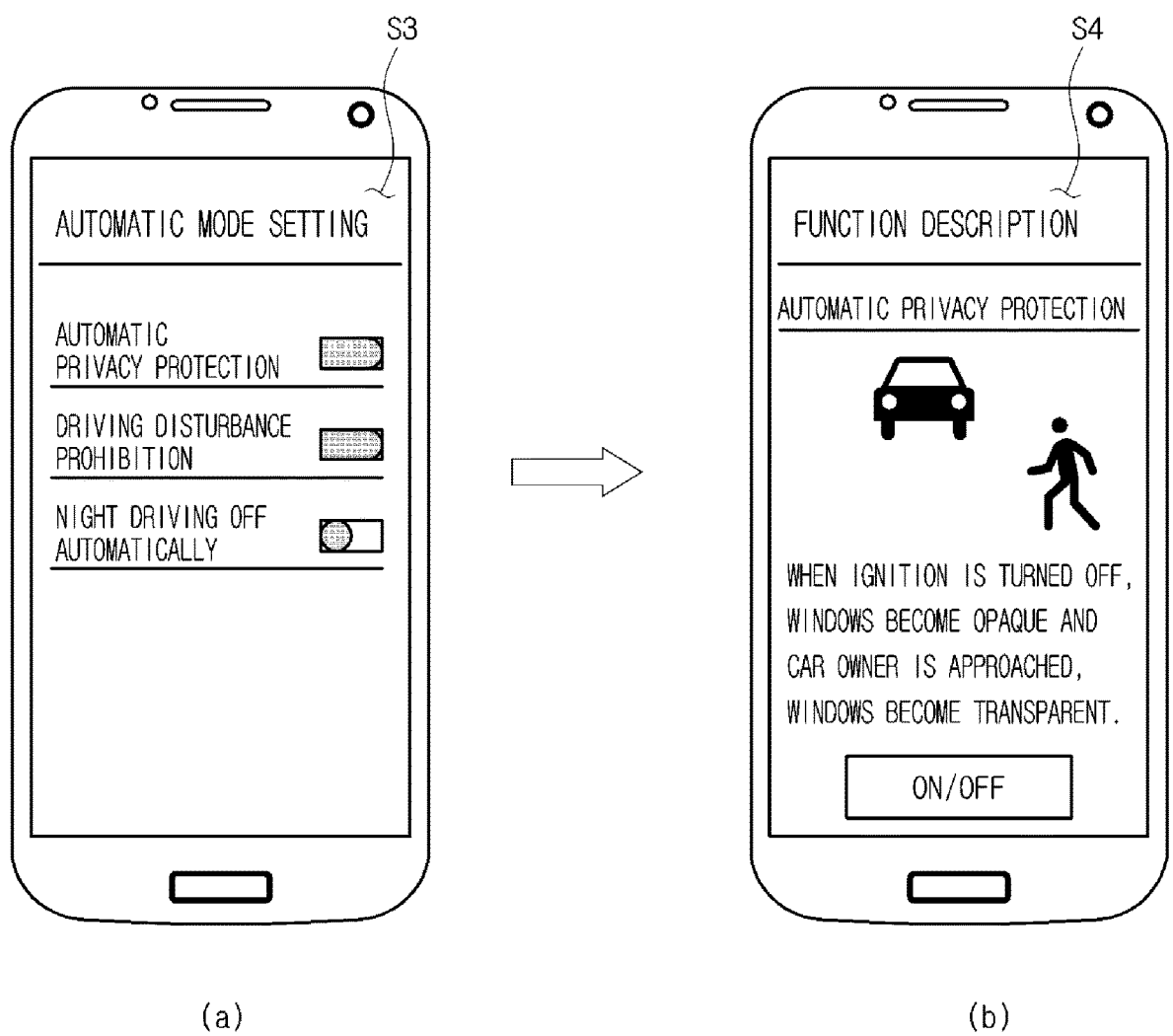
FIG. 18 is a view showing an example of an automatic mode setting screen S3 when the automatic mode setting button is selected on the mode setting screen S1.

FIG. 18 is a view showing an example of an automatic mode setting screen S3 when the automatic mode setting button is selected on the mode setting screen S1.

Referring to FIG. 18A, an automatic privacy protection button, a driving disturbance prohibition button, a night driving button, and the like may be displayed on the automatic mode setting screen S3, and an on/off button for switching a corresponding mode on or off may be further displayed to the right side of a corresponding button.

For example, when a user clicks the automatic privacy protection button, a function description screen S4 for an automatic privacy protection function may be displayed. Referring to FIG. 18B, an on/off button may be provided at a lower portion of the function description screen S4, and a user may turn on or off the automatic privacy protection function through the on/off button. Depending on the embodiment, it will be appreciated that, by clicking the automatic privacy protection button, the automatic privacy protection function may be turned on or off by means of the on/off button on the right side of the automatic privacy protection button without entering the function description screen.

Figure 19:
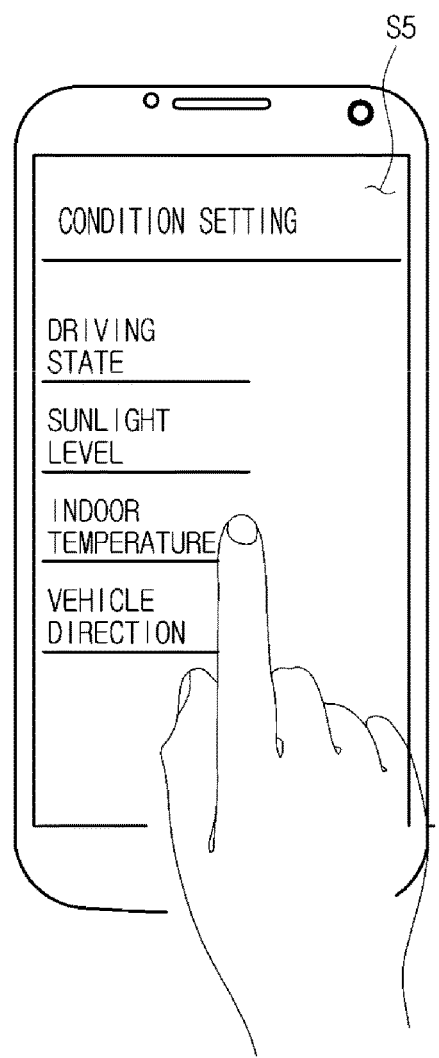
FIG. 19 is a view showing condition setting screens S5 and S6 when the condition setting button is elected on the mode setting screen.
Figure 19:
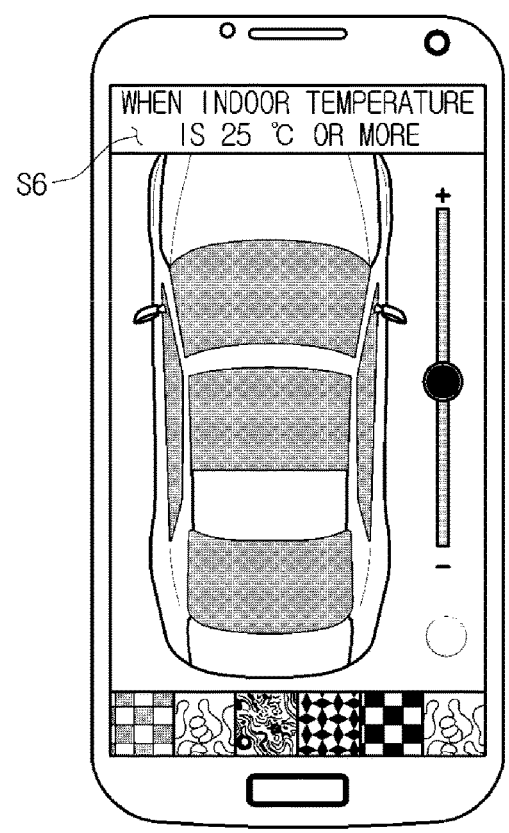

FIG. 19 is a view showing condition setting screens S5 and S6 when the condition setting button is elected on the mode setting screen.

Referring to FIG. 19A, a driving state button, a sunlight level button, an indoor temperature button, and a vehicle direction button may be displayed on the main-condition setting screen S5, but examples of a button displayable in the main-condition setting screen S5 are not limited thereto. A user may designate a window setting method corresponding to a condition by clicking one of several condition setting buttons.

For example, when a user clicks the indoor temperature button, a sub-condition setting screen S6 as shown in FIG. 19B may be displayed. The user may set control conditions of the vehicle windows 12, 13, 20, and 30 in detail through sub-condition setting screen S6 as shown in FIG. 19B when an indoor temperature is higher than or equal to 25 degrees.

The vehicle state display area A3 may display current states of the vehicle windows 12, 13, 20, and 30. According to an example, the current states of the vehicle windows 12, 13, 20, and 30 may be displayed in the vehicle state display area A3 along with the entire appearance of the vehicle 10.

A transparency setting bar may be displayed in the transparency setting area A4. The transparency of the vehicle windows 12, 13, 20, and 30 may increase when the transparency setting bar is adjusted to a "+" direction and may decrease when the transparency setting bar is adjusted to a "−" direction. When the transparency of the vehicle windows 12, 13, 20, and 30 increases, external light may be transmitted into the vehicle 10 to increase illuminance inside the vehicle 10. When the transparency of the vehicle windows 12, 13, 20, and 30 decreases, external light may be blocked to decrease illuminance inside the vehicle 10.

The color setting area A5 is an area for setting the color of the vehicle windows 12, 13, 20, and 30, and a color picker icon may be displayed in the color setting area A5. When a user selects the color picker icon, the corresponding icon may be enlarged, and the user may adjust the color of the vehicle windows 12, 13, 20, and 30 through the enlarged color picker icon.

The pattern setting area A6 is an area for setting the pattern of the vehicle windows 12, 13, 20, and 30, and a pattern setting bar may be displayed in the pattern setting area A6. The user may drag the pattern setting bar to the left or right to receive various patterns and may select one of the patterns to determine a pattern applicable to each of the vehicle windows 12, 13, 20, and 30.

The user may individually or simultaneously control the display elements 111, 112, 113, 114, 115, and 116 through the transparency setting area A4, the color setting area A5, and the pattern setting area A6.

Figure 20:
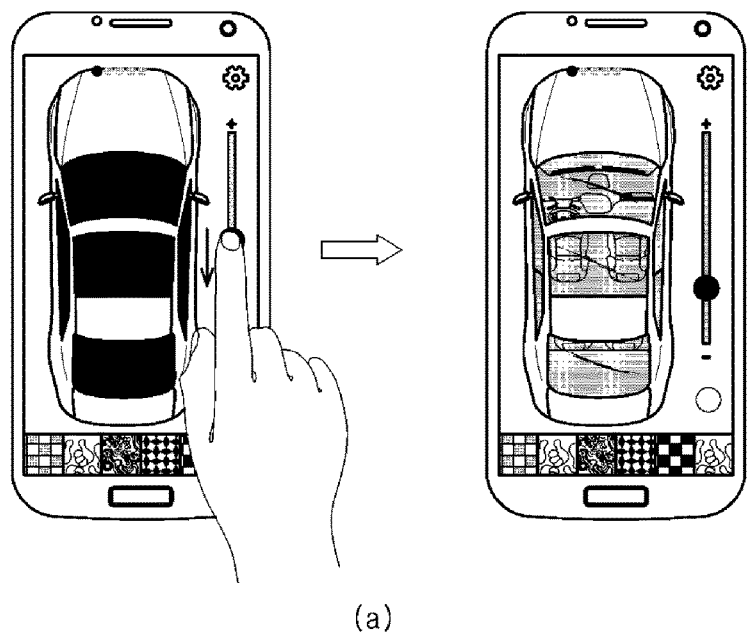
FIG. 20 is a view showing a transparency adjustment screen for the vehicle windows 12, 13, 20, and 30.
Figure 20:
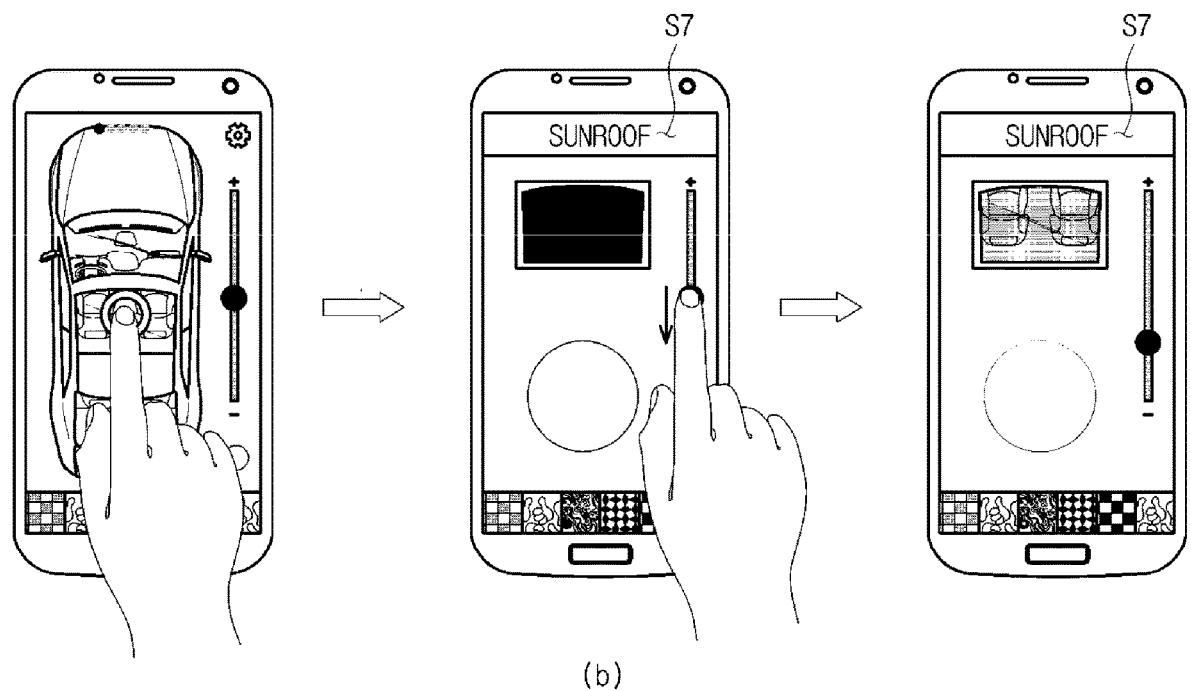
Figure 21:
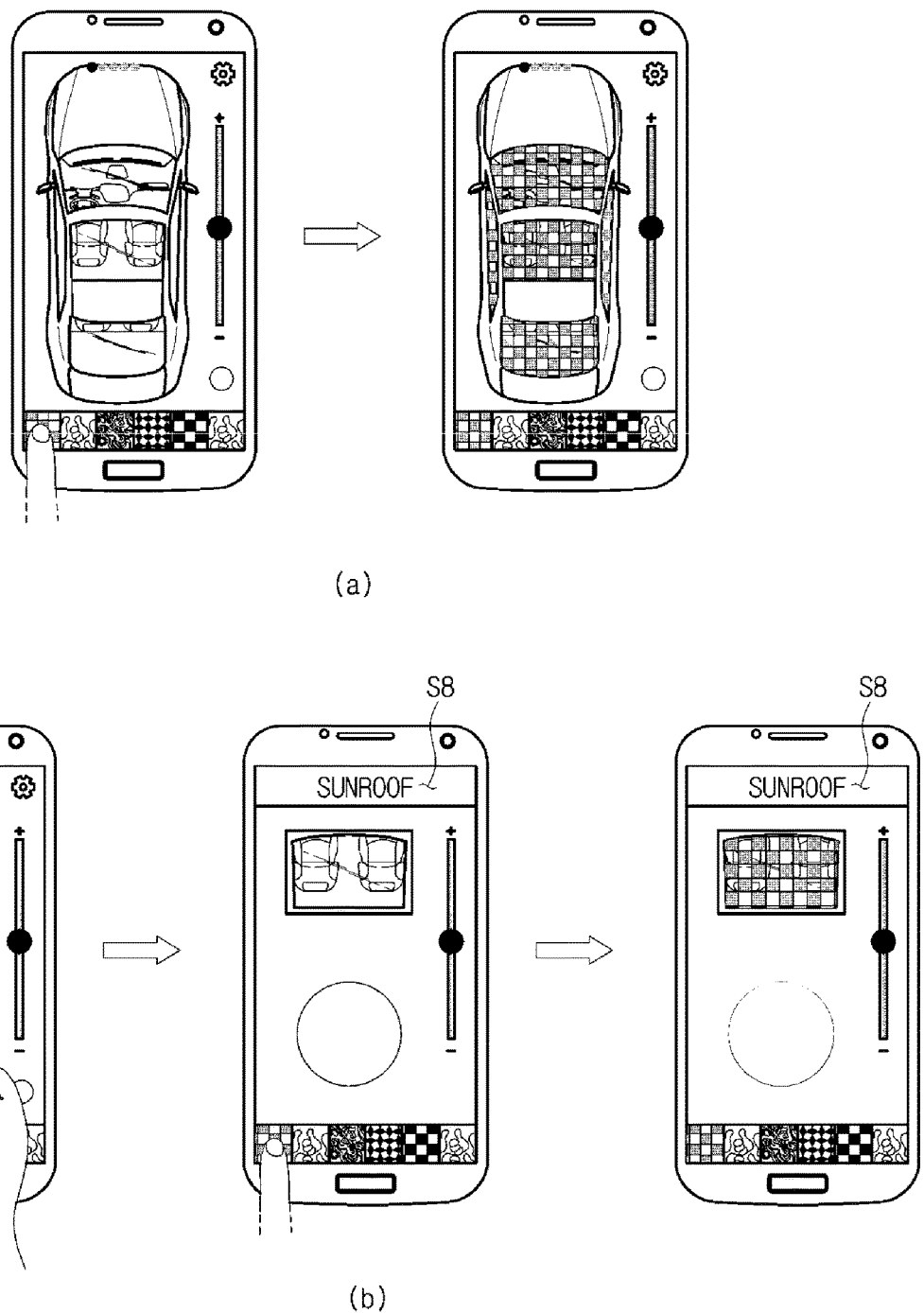
FIG. 21 is a view showing a pattern setting screen for the vehicle windows 12, 13, 20, and 30.
Figure 22:
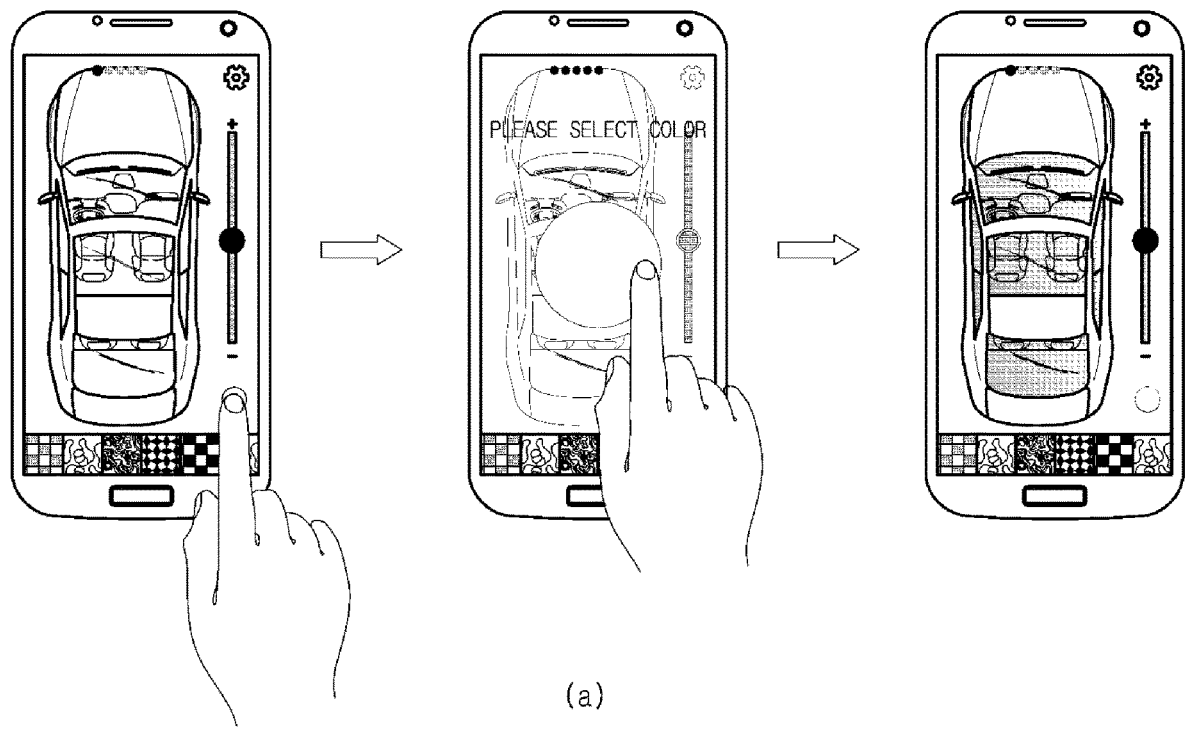
FIG. 22 is a view showing a color selection screen for the vehicle windows 12, 13, 20, and 30.
Figure 22:
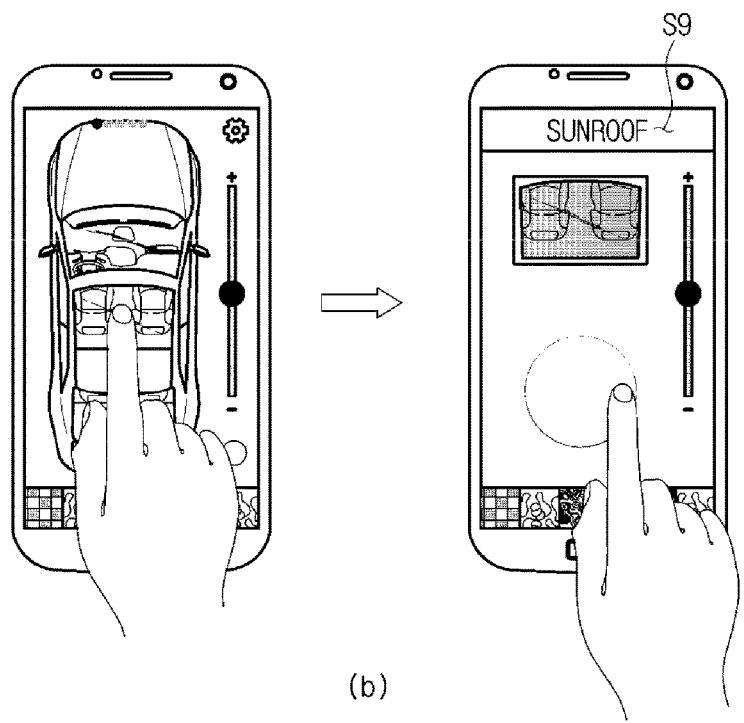

FIGS. 20 to 22 are views for describing the content of FIG. 15 in detail.

FIG. 20 is a view showing a transparency adjustment screen for the vehicle windows 12, 13, 20, and 30.

Referring to FIG. 20A, the transparency of all the windows of the vehicle 10 may be adjusted by vertically adjusting the transparency setting bar without setting a specific window. FIG. 20A shows a case in which the transparency setting bar is adjusted to a "−" direction. In this case, the transparency of all the windows of the vehicle 10 may decrease.

Referring to FIG. 20B, when a sunroof is selected from among the windows of the vehicle 10, a transparency adjustment screen S7 for the sunroof may be displayed. A target of which transparency is to be adjusted and a transparency setting bar may be displayed on the transparency adjustment screen S7. However, depending on the embodiment, a color picker provided to select the color of a target to be adjusted and a pattern setting bar provided to set a pattern of the target to be adjusted may be further displayed on the transparency adjustment screen S7.

The user may adjust the transparency of the sunroof by vertically adjusting the transparency setting bar. As described above, the transparency of the sunroof may increase when the transparency setting bar is adjusted to a "+" direction and may decrease when the transparency setting bar is adjusted to a "−" direction.

FIG. 21 is a view showing a pattern setting screen for the vehicle windows 12, 13, 20, and 30.

Referring to FIG. 21A, the pattern of all the windows may be set by setting a pattern without setting a specific window. FIG. 21A shows a case in which a tile-shaped pattern is selected. In this case, the pattern of all the windows of the vehicle 10 may be changed to the tile-shaped pattern.

Referring to FIG. 21B, when a sunroof is selected from among the windows of the vehicle 10, a pattern setting screen S8 for the sunroof may be displayed. A target of which pattern is to be set and a pattern adjustment bar may be displayed on the pattern setting screen S8 for the sunroof. However, depending on the embodiment, the transparency setting bar and the color picker may be further displayed.

The user may drag the pattern adjustment bar to the left or right to receive various patterns. Depending on the embodiment, various gradation patterns may be further provided on the pattern adjustment bar. The user may select one of the various patterns to determine a pattern to be applied to the sunroof.

FIG. 22 is a view showing a color selection screen for the vehicle windows 12, 13, 20, and 30.

Referring to FIG. 22A, when a color picker icon is selected on the color selection screen, the corresponding icon may be enlarged. The user may select a specific color from the color picker to set the color of all the windows.

Referring to FIG. 22B, when a sunroof is selected from among the windows of the vehicle 10, a color setting screen S9 for the sunroof may be displayed. A target of which color is to be set and a color picker may be displayed on the color setting screen S9. However, depending on the embodiment, the transparency setting bar and the pattern setting bar may be further displayed on the color setting screen S9. The user may determine a color to be applied to the sunroof by selecting one color from the color picker.

Subsequently, the method of controlling a state of the display element 110 by means of the AVN device 220 will be described below.

FIG. 23 is a view showing an AVN screen S10 for generally controlling the vehicle windows 12, 13, 20, and 30. Referring to FIG. 21, the AVN screen S10 may include a window transparency setting button, a color setting button, a pattern setting button, and a mode setting button, and may further include a gradation setting button depending on the embodiment. A user may select one of the buttons to control a state of each of the vehicle windows 12, 13, 20, and 30.

FIG. 24 is a view showing an example of a color setting screen S11 when the color setting button is selected. Referring to FIG. 24, a list of targets of which color is allowed to be set may be displayed in a left portion of the color setting screen S11, and a color picker and the appearance of a target to be set may be displayed in a right portion of the color setting screen S11. The user may select a target to be set through the list provided in the left portion of the screen and may select the color of the target to be set through the color picker.

FIG. 25 is a view showing an example of a pattern setting screen S12 when the pattern setting button is selected. Referring to FIG. 25, a list of targets of which pattern is allowed to be set may be displayed in a left portion of the pattern setting screen S12, and a pattern list and the appearance of a target to be set may be displayed in a right portion of the pattern setting screen S12. The user may select a target to be set through the list provided in the left portion of the screen and may select the pattern of the target to be set through the pattern list.

Figure 26:
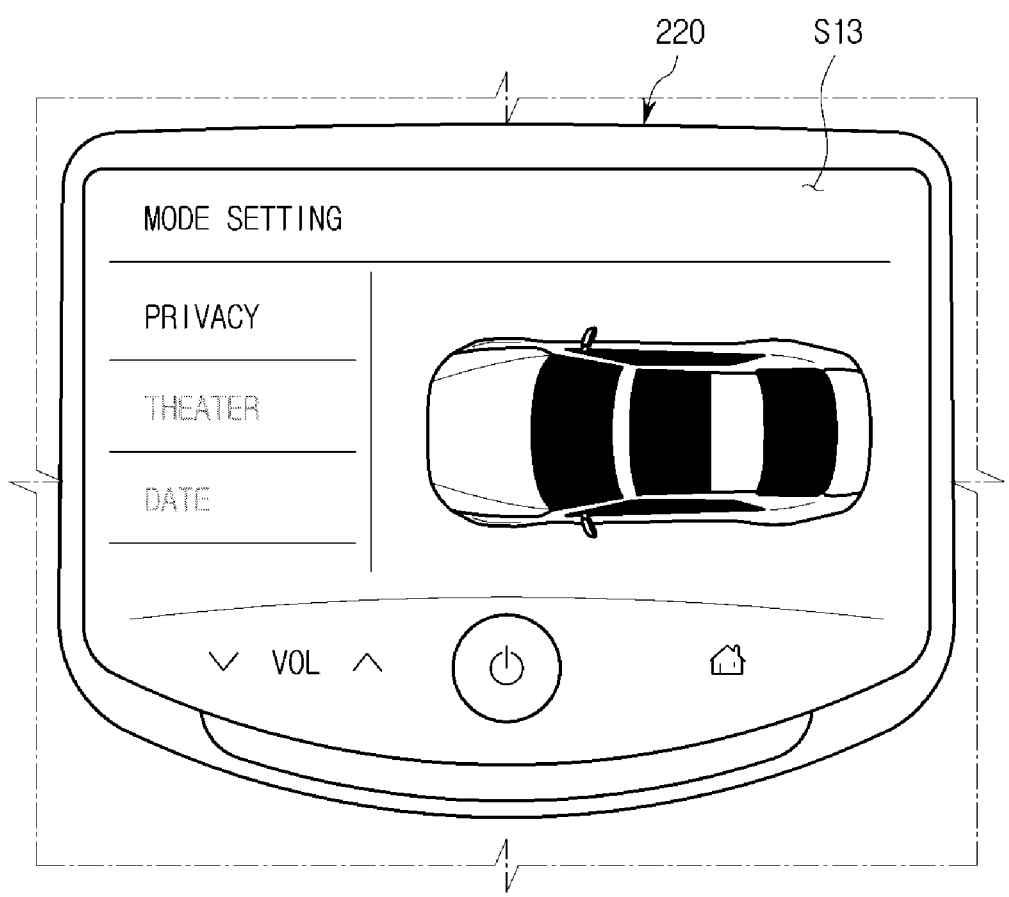
FIG. 26 is a view showing an example of a mode setting screen S13 when the mode setting button is selected.

FIG. 26 is a view showing an example of a mode setting screen S13 when the mode setting button is selected. Referring to FIG. 26, a list of mode setting methods may be displayed in a left portion of the mode setting screen S13, and the appearance of the vehicle 10 may be displayed in a right portion of the mode setting screen S13 to visually display a corresponding mode. A user may select the list provided in the left portion of the screen to set a mode and may recognize a window setting method corresponding to the set mode through a preview screen provided in the right portion of the screen.

Figure 27:
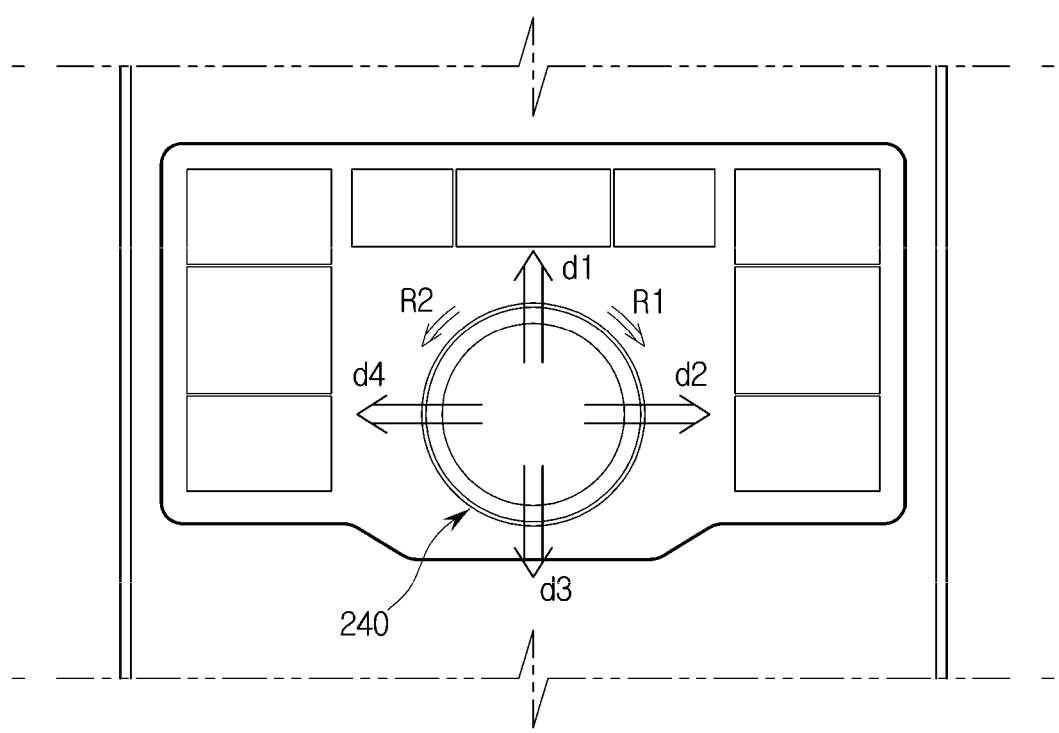
FIG. 27 is a view showing a method of controlling a state of the display element 110 through the dial operating unit 240.

FIG. 27 is a view showing a method of controlling a state of the display element 110 through the dial operating unit 240. For convenience of description, the method of controlling a state of the display element 110 through the dial operating unit 240, which is an example of the vehicle operating unit 240, will be described below.

Referring to FIG. 27, the dial operating unit 240 may be tilted upward (d1), downward (d2), leftward (d3), and rightward (d4) and may be rotated clockwise (R1) or counterclockwise (R2). The user may adjust the transparency, the color, and the like by tilting the dial operating unit 240 upward, downward, leftward, and rightward. Depending on the embodiment, the user may adjust the transparency, the color, and the like by rotating the dial operating unit 240 clockwise or counterclockwise.

The display element 110 may be modified into various forms other than the configurations that have been described with reference to FIGS. 2 to 10. Various modifications of the display element 110 will be described below.

Figure 28:
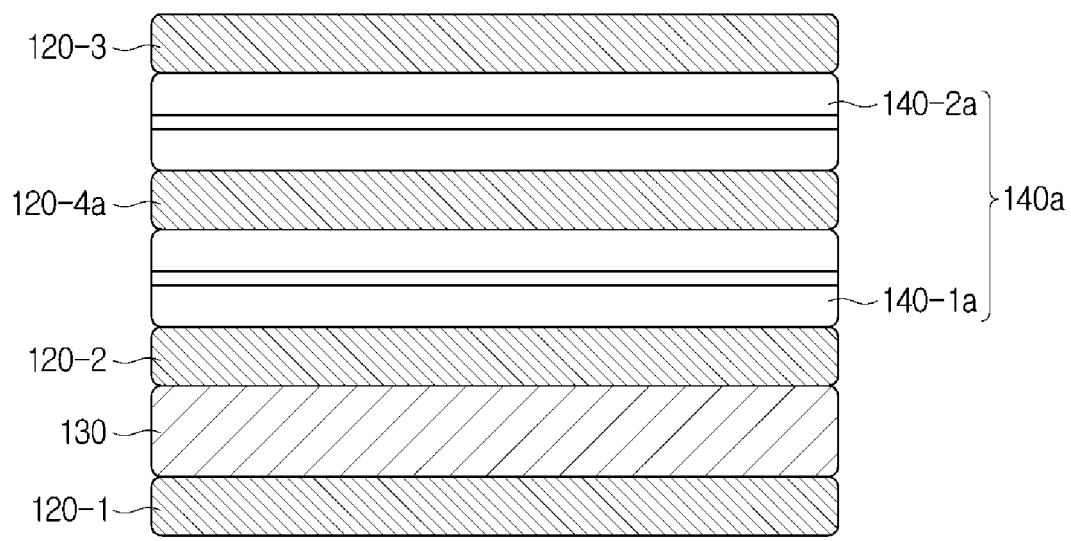
FIG. 28 is a view showing another example of a display element 110a provided in the smart window device 100 according to an embodiment.
Figure 29:
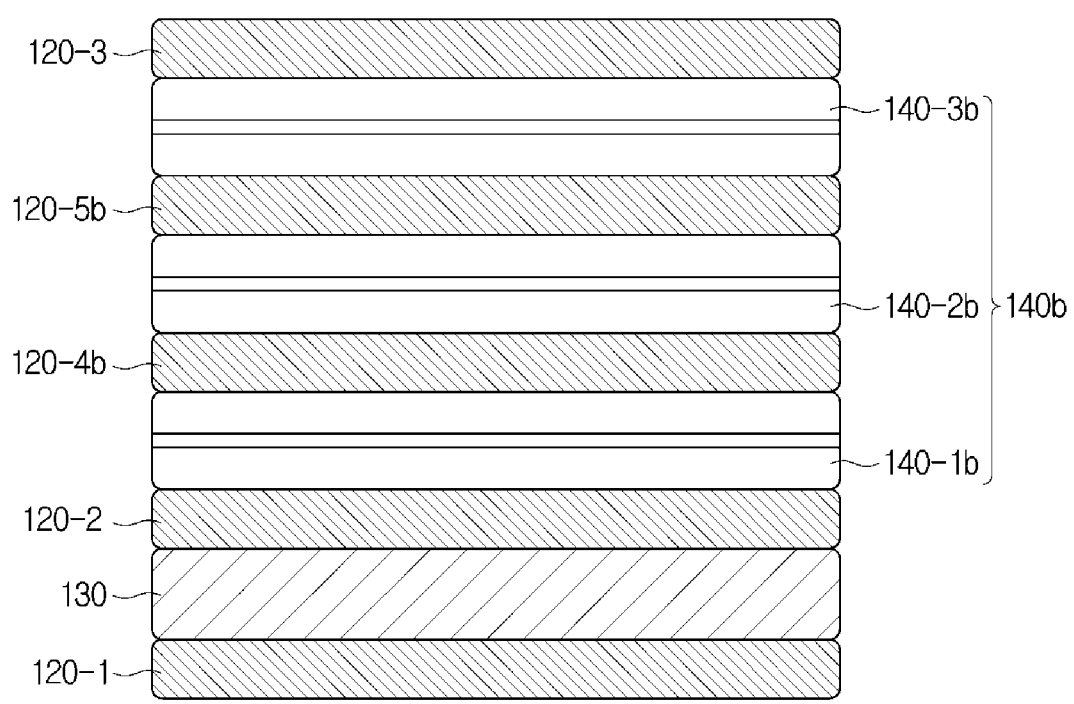
FIG. 29 is a view showing still another example of a display element 110b provided in the smart window device 100 according to an embodiment.

FIG. 28 is a view showing another example of a display element 110a provided in the smart window device 100 according to an embodiment, and FIG. 29 is a view showing still another example of a display element 110b provided in the smart window device 100 according to an embodiment.

The display element 110a shown in FIG. 28 may include a first substrate 120-1, a transparency adjustment layer 130 disposed adjacent to the first substrate 120-1, a second substrate 120-2 disposed adjacent to the transparency adjustment layer 130, a liquid crystal layer 140a disposed adjacent to the second substrate 120-2, and a third substrate 120-3 disposed adjacent to the liquid crystal layer 140a. The display element 110b shown in FIG. 29 may include a first substrate 120-1, a transparency adjustment layer 130 disposed adjacent to the first substrate 120-1, a second substrate 120-2 disposed adjacent to the transparency adjustment layer 130, a liquid crystal layer 140b disposed adjacent to the second substrate 120-2, and a third substrate 120-3 disposed adjacent to the liquid crystal layer 140b. Descriptions of the first substrates 120-1, the transparency adjustment layers 130, the second substrates 120-2, and the third substrates 120-3 of the display elements 110a and 110b shown in FIGS. 28 and 29 are substantially the same as the description in FIG. 2 and thus will be provided, focusing on differences with the display element 110 shown in FIG. 2.

The display elements 110a and 110b shown in FIGS. 28 and 29 differ from the display element 110 shown in FIG. 2 in that the display elements 110a and 110b have a plurality of liquid crystal layers 140a and a plurality of liquid crystal layers 140b, respectively. In detail, the plurality of liquid crystal layers 140a, 140b provided in the display element 110a, 110b may be stacked vertically with respect to the front surface of the display element 110.

Referring to FIG. 28, the liquid crystal layer 140a may include a first liquid crystal layer 140-1a configured to reflect light having a first wavelength range and a second liquid crystal layer 140-2a configured to reflect light having a second wavelength range. A fourth substrate 120-4a may be disposed between the first liquid crystal layer 140-1a and the second liquid crystal layer 140-2a.

Here, the first liquid crystal layer 140-1a and the second liquid crystal layer 140-2a each may reflect light having a wavelength range corresponding to at least one of red-based light, green-based light, and blue-based light. For example, the first liquid crystal layer 140-1a may reflect light having a red wavelength range, and the second liquid crystal layer 140-2a may reflect light having a green wavelength range.

Referring to FIG. 29, the liquid crystal layer 140b may include a first liquid crystal layer 140-1b configured to reflect light having a first wavelength range, a second liquid crystal layer 140-2b configured to reflect light having a second wavelength range, and a third liquid crystal layer 140-3b configured to reflect light having a third wavelength range. A fourth substrate 120-4b may be disposed between the first liquid crystal layer 140-1b and the second liquid crystal layer 140-2b, and a fifth substrate 120-5b may be disposed between the second liquid crystal layer 140-2b and the third liquid crystal layer 140-3b.

The display elements 110b shown in FIGS. 28 and 29 may have a structure in which two or three liquid crystal layers for reflecting light having different wavelength ranges are vertically stacked and thus may implement various colors compared to the display element 110 shown in FIG. 2.

Figure 30:
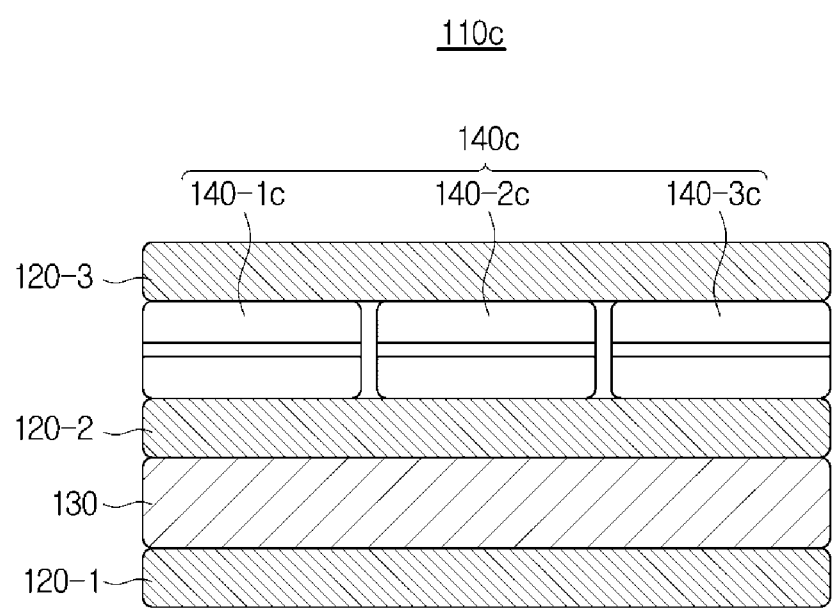
FIG. 30 is a view showing still another example of a display element 110c provided in the smart window device 100 according to an embodiment.
Figure 31:
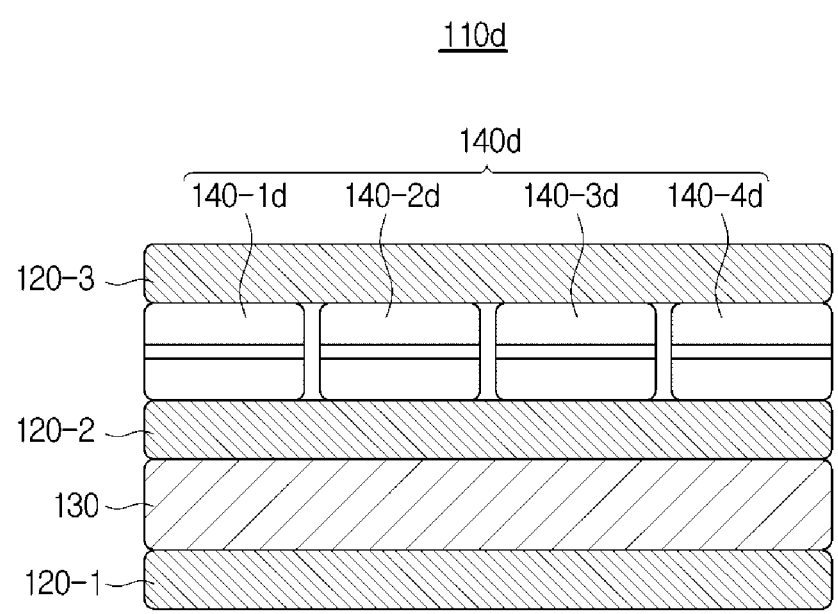
FIG. 31 is a view showing still another example of a display element 110d provided in the smart window device 100 according to an embodiment.

FIG. 30 is a view showing still another example of a display element 110c provided in the smart window device 100 according to an embodiment, and FIG. 31 is a view showing still another example of a display element 110d provided in the smart window device 100 according to an embodiment.

The display element 110c shown in FIG. 30 may include a first substrate 120-1, a transparency adjustment layer 130 disposed adjacent to the first substrate 120-1, a second substrate 120-2 disposed adjacent to the transparency adjustment layer 130, a liquid crystal layer 140c disposed adjacent to the second substrate 120-2, and a third substrate 120-3 disposed adjacent to the liquid crystal layer 140c. The display element 110d shown in FIG. 31 may include a first substrate 120-1, a transparency adjustment layer 130 disposed adjacent to the first substrate 120-1, a second substrate 120-2 disposed adjacent to the transparency adjustment layer 130, a liquid crystal layer 140d disposed adjacent to the second substrate 120-2, and a third substrate 120-3 disposed adjacent to the liquid crystal layer 140d. Descriptions of the first substrates 120-1, the transparency adjustment layers 130, the second substrates 120-2, and the third substrates 120-3 of the display elements 110c and 110d shown in FIGS. 30 and 31 are substantially the same as the description in FIG. 2 and thus will be provided, focusing on differences with the display element 110 shown in FIG. 2.

The display elements 110c and 110d shown in FIGS. 30 and 31 are similar to the display element 110 shown in FIG. 2 in that the liquid crystal layers 140c and 140d are each provided as a single layer, but are different from the display elements 110c and 110d shown in FIG. 2 in that the liquid crystal layers 140c and 140d are provided in plural. In other words, the display elements 110c and 110d shown in FIGS. 30 and 31 have a structure in which a plurality of liquid crystal layers 140 are arranged horizontally with respect to the front surface of the display element 110.

Referring to FIG. 30, the liquid crystal layer 140c may include a first liquid crystal layer 140-1c configured to reflect light having a first wavelength range, a second liquid crystal layer 140-2c configured to reflect light having a second wavelength range, and a third liquid crystal layer 140-3c configured to reflect light having a third wavelength range. The liquid crystal layers 140-1c, 140-2c, and 140-3c may be arranged horizontally with respect to the front surface of the display element 110c.

The first liquid crystal layer 140-1c, the second liquid crystal layer 140-2c, and the third liquid crystal layer 140-3c may each reflect light having a wavelength range corresponding to at least one of red-based light, green-based light, and blue-based light. For example, the first liquid crystal layer 140-1c may reflect light having a red wavelength range, the second liquid crystal layer 140-2c may reflect light having a green wavelength range, and the third liquid crystal layer 140-3c may reflect light having a blue wavelength range.

Referring to FIG. 31, the liquid crystal layer 140d may include a first liquid crystal layer 140-1d configured to reflect light having a first wavelength range, a second liquid crystal layer 140-2d configured to reflect light having a second wavelength range, a third liquid crystal layer 140-3d configured to reflect light having a third wavelength range, and a fourth liquid crystal layer 140-4d configured to reflect light having a fourth wavelength range. The liquid crystal layers 140-1d, 140-2d, 140-3d, and 140-4d may be arranged horizontally with respect to a virtual plane parallel to the display element 110d.

The fourth liquid crystal layer 140-4d may reflect light having a wavelength range other than the red wavelength range, green wavelength range, and blue wavelength range. For example, the fourth liquid crystal layer 140-4d may reflect light having a yellow or white wavelength range, and examples of the wavelength range of the light reflected by the fourth liquid crystal layer 140-4d are not limited thereto.

The display elements 110d shown in FIGS. 30 and 31 may have a structure in which a plurality of liquid crystal layers for reflecting light of different wavelength ranges are horizontally arranged, and thus may implement various colors compared to the display element 110 shown in FIG. 2.

Subsequently, various modifications of an electrode structure of the display element 110 provided in the smart window device 100 according to an embodiment will be described with reference to FIGS. 32 to 34.

Figure 32:
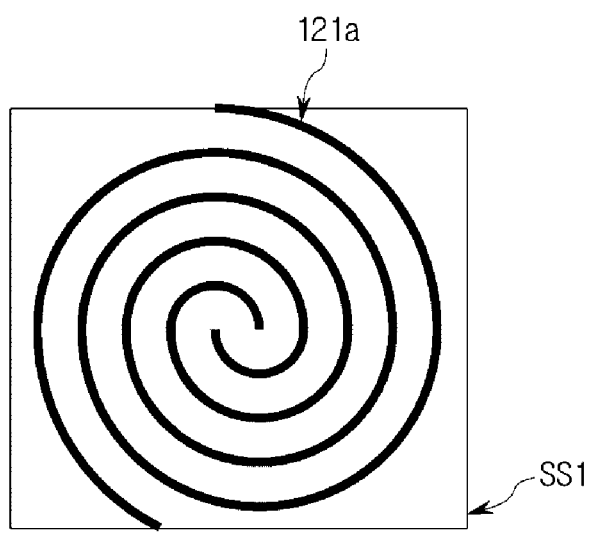
FIG. 32 is a view showing a modification of an electrode structure formed on a substrate surface.
Figure 33:
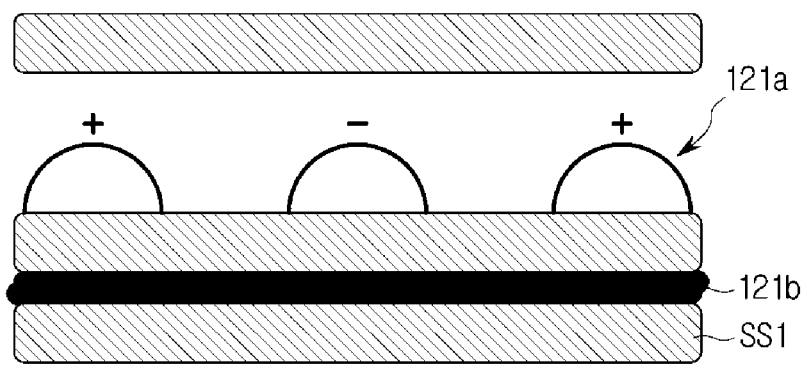
FIG. 33 is a view showing a section of the electrode structure shown in FIG. 32.
Figure 34:
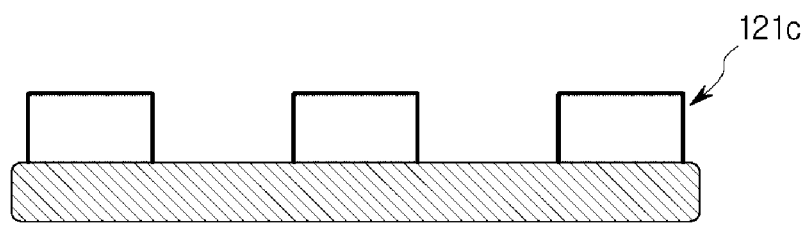
FIG. 34 is a view showing various modifications of the electrode structure.
Figure 34:
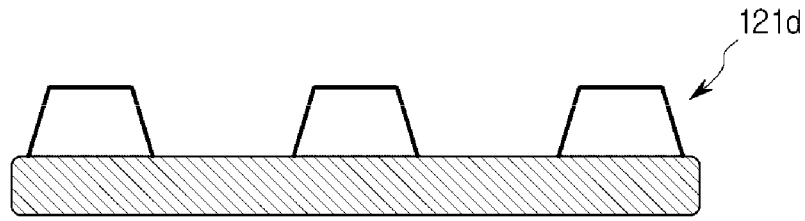
Figure 34:
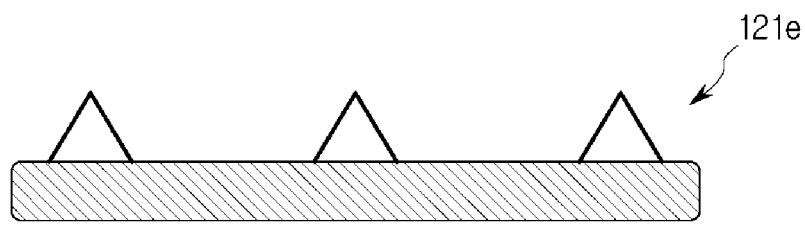

FIG. 32 is a view showing a modification of an electrode structure formed on a substrate surface, FIG. 33 is a view showing a section of the electrode structure shown in FIG. 32, and FIG. 34 is a view showing various modifications of the electrode structure.

In the above-described embodiment, it is assumed that the electrode structure is disposed over or under the transparency adjustment layer 130 or the liquid crystal layer 140. In other words, a case in which a twisted nematic (TN) scheme is applied has been described. The TN scheme is a technique for driving liquid crystal molecules by installing an electrode between two substrates, arranging the liquid crystal molecules to be twisted by 90 degrees, and then applying a voltage to the electrode. The TN scheme provides excellent contrast and color reproducibility, but has a narrow viewing angle.

In order to solve the problem of the narrow viewing angle of the TN scheme, a structure of an In-Plane Switching (IPS) electrode 121a may be applied to the display element 110 according to the disclosed invention, as shown in FIG. 32. The IPS is one method of forming two electrodes on a single substrate and adjusting a director of liquid crystals by using a transverse electric field generated between the two electrodes 121a. When the structure in which the electrodes 121a are horizontally disposed is employed, a rotation distance of a cholesteric liquid crystal molecule C is shortened. Thus, it is possible to improve rotational speed of the cholesteric liquid crystal molecule C.

Depending on the embodiment, the structure of the electrode 121a may be provided as a dual spiral structure. When the structure of the electrode 121a is formed as a dual spiral structure, the cholesteric liquid crystal molecule C may be oriented in a wide direction. Thus, it is possible to improve the viewing angle to 90 degrees or higher.

The display element 110 according to an embodiment of the disclosed invention may be driven in Fringe Field Switching (FFS) as well as in the ISP. In detail, referring to FIG. 31, the electrode 121a may be formed to protrude from the surface of the substrate, and a common electrode 121b may be disposed inside the substrate. When the electrode 121a is formed as a protrusion structure, a field between such protruding electrodes 121a is strengthened, and thus it is possible to reduce a driving voltage. That is, a space between the electrodes 121a is formed to be narrow. Thus, a fringe field may be formed between the electrodes 121a, and liquid crystal molecules may be operated by the fringe field formed between the electrodes 121a.

Depending on the embodiment, the electrode protrusion structure may be provided in various shapes. Referring to FIG. 34, the electrode protrusion structure may be provided in a rectangular shape 121c, a trapezoidal shape 121d, or a triangular shape 121e as well as in a circular shape. The electrode protrusion structure may be formed by variously providing the shape of a polymer that supports the electrode.

The display element of the smart window device may further include a quantum layer provided to improve optical characteristics of a liquid crystal layer. A modification of the display element that further includes the quantum layer will be described below.

Figure 35:
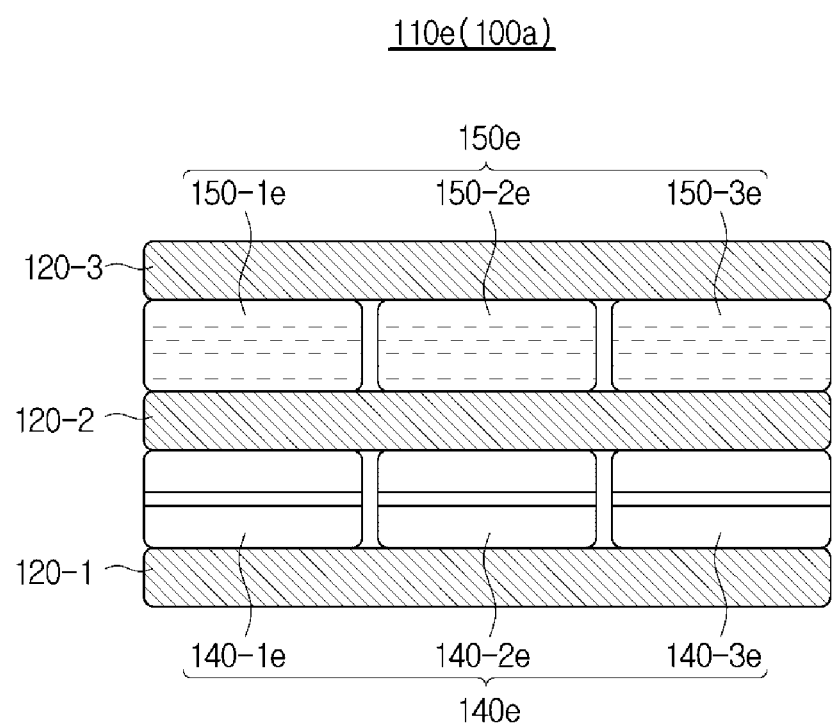
FIG. 35 is a view showing an example of a display element 110e provided in a smart window device 100a according to another embodiment.

FIG. 35 is a view showing an example of a display element 110e provided in a smart window device 100a according to another embodiment.

Referring to FIG. 35, the display element 110e includes a first substrate 120-1, a liquid crystal layer 140e disposed adjacent to the first substrate 120-1, a second substrate 120-2 disposed adjacent to the liquid crystal layer 140e, a quantum layer 150e disposed adjacent to the second substrate 120-2, and a third substrate 120-3 disposed adjacent to the quantum layer 150e.

The display element 110e according to this embodiment may have a structure in which electrodes are disposed over and under each layer. Here, the foregoing description with reference to FIG. 2 that is associated with the electrode structure will be omitted. Depending on the embodiment, the electrode structure of the display element 110e may employ a structure in which electrodes are horizontally arranged on each layer of the substrate instead of the structure in which electrodes are disposed over and under each layer. That is, an IPS electrode structure, an FFS electrode structure, or an IPS/FFS electrode structure may be employed, and thus it is possible to improve a driving speed of the display element 110e. The foregoing description with reference to FIGS. 32 to 34 that is associated with the modification of the electrode structure will be omitted. For convenience of description, it is assumed that the electrode structure is a structure in which electrodes are disposed over and under each layer.

The liquid crystal layer 140e, which is a layer provided to implement red color, green color, or blue color, may be provided between the first substrate 120-1 and the second substrate 120-2.

The liquid crystal layer 140e may be provided as a single layer. In this case, the liquid crystal layer 140e may have the structures that have been described with reference to FIGS. 3 and 4. Here, the foregoing description with reference to FIGS. 3 and 4 will be omitted.

A plurality of layers may be provided as the liquid crystal layer 140e. In this case, the plurality of liquid crystal layers 140e may be stacked vertically with respect to the display element 110 or may be arranged horizontally with respect to a virtual plane parallel to the display element 110. The associated foregoing description associated with a case in which a plurality of layers are provided as the liquid crystal layer 140e will be omitted, and a structure in which the plurality of liquid crystal layers 140e are horizontally arranged will be described below.

The liquid crystal layer 140e may have a structure in which a plurality of liquid crystal layers 140-1e, 140-2e, and 140-3e are arranged horizontally with respect to a virtual plane parallel to the display element 110e. The liquid crystal layer 140e may include a first liquid crystal layer 140-1e configured to reflect light having a first wavelength range, a second liquid crystal layer 140-2e configured to reflect light having a second wavelength range, and a third liquid crystal layer 140-3e configured to reflect light having a third wavelength range.

The first liquid crystal layer 140-1e, the second liquid crystal layer 140-2e, and the third liquid crystal layer 140-3e may each reflect light having a wavelength range corresponding to at least one of red-based light, green-based light, and blue-based light. For example, the first liquid crystal layer 140-1e may reflect light having a red wavelength range, the second liquid crystal layer 140-2e may reflect light having a green wavelength range, and the third liquid crystal layer 140-3e may reflect light having a blue wavelength range.

Depending on the embodiment, the liquid crystal layer 140e may further include a fourth liquid crystal layer configured to reflect light having a fourth wavelength range. In this case, the fourth liquid layer may reflect light having a wavelength range other than those of the red-based light, the green-based light, and the blue-based light.

The quantum layer 150e, which is a layer provided to implement optical characteristics of the liquid crystal layer 140e, may be disposed between the second substrate 120-2 and the third substrate 120-3. Depending on the embodiment, the quantum layer 150e may be provided between the first substrate 120-1 and the second substrate 120-2, and the liquid crystal layer 140e may be provided between the second substrate 120-2 and the third substrate 120-3.

The quantum layer 150e may be patterned to match the structure of the liquid crystal layer 140e. In this embodiment, the liquid crystal layer 140e is arranged horizontally with respect to a virtual plane parallel to the display element 110e. Referring to FIG. 33, the quantum layer 150e may also be arranged horizontally with respect to a virtual plane parallel to the display element 110e. More specifically, the first, second, and third liquid crystal layers 140-1e, 140-2e, and 140-3e may each be arranged horizontally with respect to the front surface of the display element 110e, and also the first, second, and third quantum layers 150-1e, 150-2e, and 150-3e may each be arranged horizontally with respect to the front surface of the display element 110e.

The quantum layer 150e may include a cholesteric liquid crystal molecule C and a quantum rod QR, and the quantum rod QR may be disposed to form a helical structure together with the cholesteric liquid crystal molecule C.

Generally, the quantum rod QR has a low solubility in the cholesteric liquid crystal molecule C. When a large amount of quantum rod QR is added to the cholesteric liquid crystal molecule C, aggregation may occur between such quantum rods QR. Thus, it is possible to reduce the emitting properties of the quantum layer 150e.

In this case, the quantum layer 150e of the display element 110 according to the disclosed invention includes a quantum rod QR having a structure in which a surfactant is bonded to a surface of the quantum rod QR, and thus it is possible to increase the solubility of the quantum rod QR in the cholesteric liquid crystal molecule C.

Figure 36:
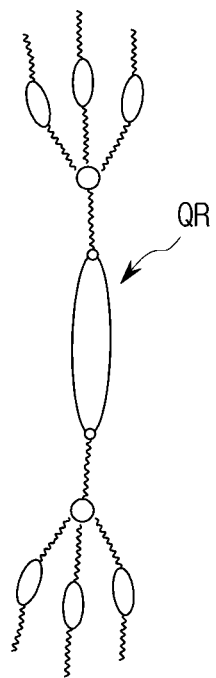
FIG. 36 is a view showing an example in which a surfactant is bonded to a surface of the quantum rod QR.

FIG. 36 is a view showing an example in which a surfactant is bonded to a surface of the quantum rod QR. Referring to FIG. 36, the quantum rod QR according to an example may have a surfactant bonded combined at both sides.

Generally, the quantum rod QR, which is an inorganic substance, has a property of being insoluble in the cholesteric liquid crystal molecule C, which is an organic substance. Thus, the display element 110 according to the disclosed invention may bond an organic surfactant to the surface of the quantum rod QR to facilitate mixing of the quantum rod QR, which is an inorganic substance, in the cholesteric liquid crystal molecule C, which is an organic substance. In this case, the organic surfactant may have a portion favorable to the quantum rod QR at one end and a portion favorable to the cholesteric liquid crystal molecule C at the other end.

The surfactant may have a structure as shown in the following structural formulas 1 to 4.

[Structural formula 1]

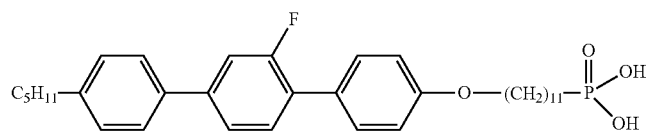

[Structural formula 2]

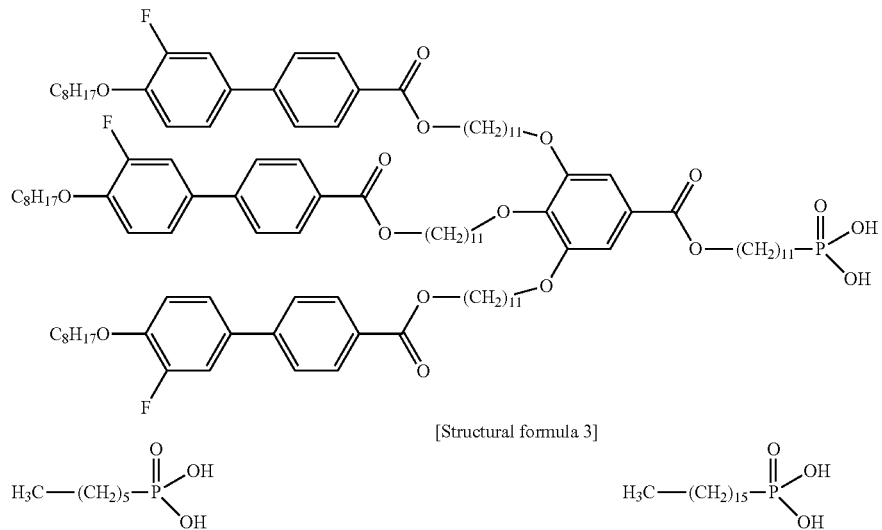

[Structural formula 3]

H$_3$C—(CH$_2$)$_5$—P(=O)(OH)(OH)

[Structural formula 4]

H$_3$C—(CH$_2$)$_{15}$—P(=O)(OH)(OH)

Referring to structural formulas 1 to 4, the surfactant, which contains phosphorus P, has one end with a property of easily bonding to the quantum rod QR and the other end with a property of easily bonding to the cholesteric liquid crystal molecule C. As a result, by bonding the surfactant to one end of the quantum rod QR having the structure as shown in structural formulas 1 to 4, it is possible to increase the solubility of the quantum rod QR in the cholesteric liquid crystal molecule C.

However, examples of available surfactant are not limited to the above examples (i.e., dendritic surfactant with 3 promesogenic biphenyl units (structural formula 2), 1-hexlyphosphonic acid (structural formula 3), or the like) and may include modifications readily conceivable to those skilled in the art.

Depending on the embodiment, various kinds of surfactant may be used. This is because it is difficult to bond a sufficient amount of surfactant to the surface of the quantum rod QR because of structural properties of the surfactant when the surfactant has a too large particle. According to an example, the surfactant of structural formula 2 and the surfactant of structural formula 3 may be bonded to the surface of the quantum rod QR at a ratio of 1:4. By providing the surfactant mixing ratio as described above, it is possible to improve the dispersibility of the quantum rod QR in the cholesteric liquid crystal molecule C. However, the type and the mixing ratio of available surfactant are not limited to the above example.

The surfactant may be bonded to both ends of the quantum rod QR. In other words, the quantum rod QR may be end-capped by the surfactant, and thus it is possible to improve a response speed of the display element 110e.

Generally, surfactant may be more easily bonded to the surface of a quantum dot, which has an uniform orientation, than to the surface of a bar rod having a uniform orientation. However, the surface of the quantum rod QR has different orientations, and thus a process different from that of a quantum dot may be required in order to bond a surfactant to both ends of the quantum rod QR.

A process of bonding a surfactant to both the ends of the quantum rod QR will be described below.

First, the surface of the quantum rod QR may be coated with cetyltrimethylammonium bromide (CTAB) by a seed-mediated route. Subsequently, L-cysteine is added to a solution prepared by mixing a quantum rod (QR) and sodium chloride to connect both ends of the quantum rod QR. L-cysteine has a property of preferentially bonding to the ends of the quantum rod QR. When the ends of the quantum rod QR is connected, the quantum rod QR may be dispersed through ultrasonic treatment. Subsequently, the remaining CTAB around the quantum rod QR is functionalized to a surfactant having structural formula 2. Subsequently, the L-cysteine at the ends of the quantum rod QR is functionalized to dithiol. Surfactants of structural formulas 2 and 3 may be grafted at the ends of the quantum rod QR at a ratio of 1:4 by a dithiol ligand. Subsequently, the surfactant of structural formula 2 is replaced with HS-PEO. Once the surfactants of structural formulas 2 and 3 are successfully bonded to the ends of the quantum rod QR, the ends of the quantum rod QR may form an end-capped structure in which the ends are not superimposed on each other. The method of forming the end-capped structure of the quantum rod QR is not limited thereto, and may include modifications readily conceivable to those skilled in the art.

By using a structure in which the surfactant is end-capped at the ends of the quantum rod QR, it is possible to improve a response speed of the display element 110e. That is, when an electric field is applied, the arrangement of the cholesteric liquid crystal molecule C may be quickly changed along the surfactant provided at the ends of the quantum rod QR. AS a result, it is possible to improve a response speed of the display element 110.

Depending on the embodiment, the display element 110e may include a touch panel provided to receive a user's touch and a front light panel provided in preparation for low external brightness. However, the touch panel and the front light panel may be omitted depending on cases.

An example of mode switching of the quantum layer 150e due to application of an electric field will be described below.

Figure 37:
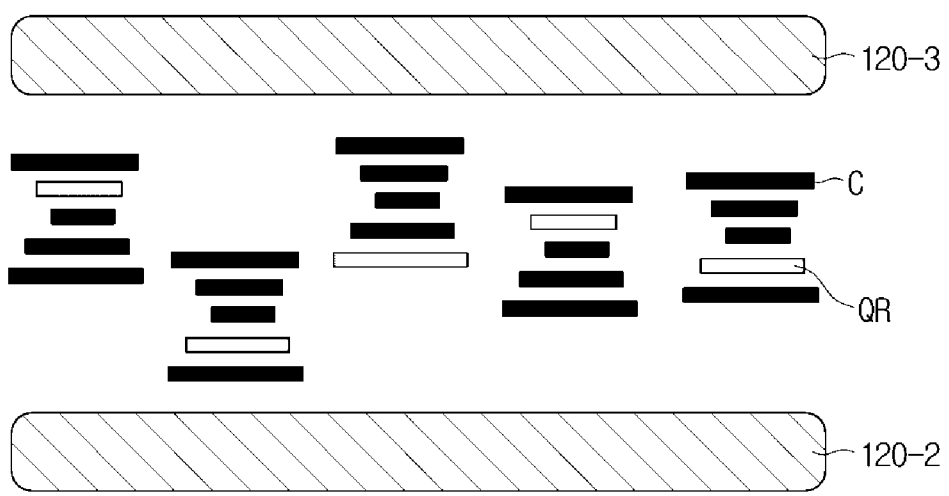
FIG. 37 is an enlarged view of an emitting mode of the quantum layer 150e of the display element 110 according to an embodiment.
Figure 38:
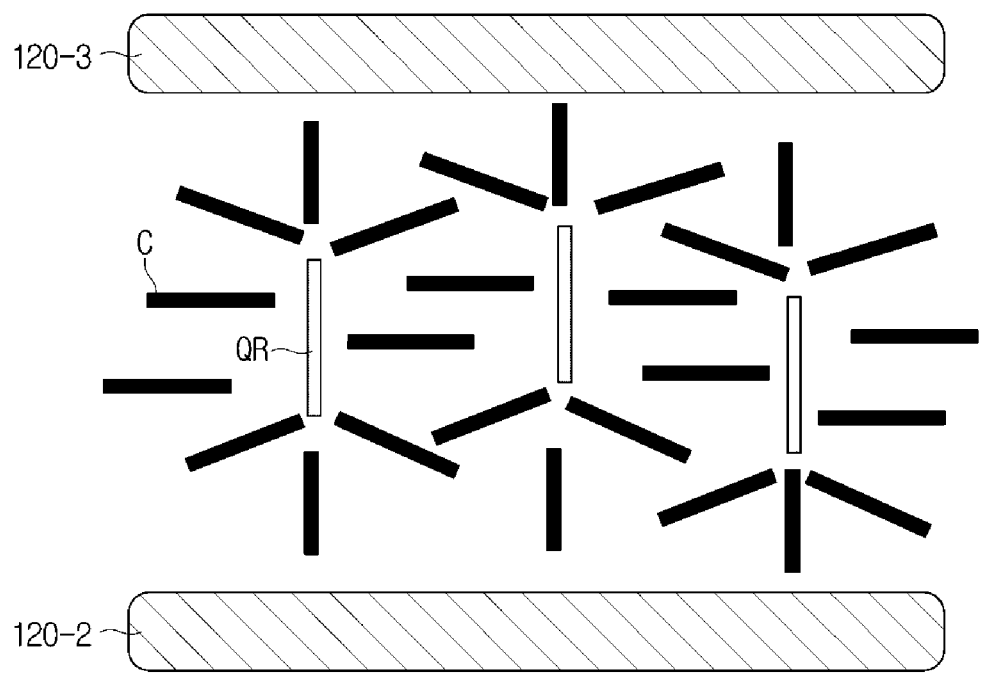
FIG. 38 is an enlarged view of a transparent mode of the quantum layer 150e of the display element 110 according to an embodiment.

FIG. 37 is an enlarged view of an emitting mode of the quantum layer 150e of the display element 110 according to an embodiment, and FIG. 38 is an enlarged view of a transparent mode of the quantum layer 150e of the display element 110 according to an embodiment.

Referring to FIG. 37, when no electric field is applied to the quantum layer 150e, a cholesteric liquid crystal molecule C and a quantum rod QR may form a texture structure in a planer state. That is, the cholesteric liquid crystal molecule C and the quantum rod QR may be formed by repeating a molecular twist at regular intervals. In this case, a portion of light incident on the quantum layer 150e exhibits fluorescence by the quantum rod QR. Fluorescence is a phenomenon in which a material emits light by an optical stimulus, and the wavelength range of emitted light may vary depending on the size of the quantum rod QR. More specifically, when the size of the quantum rod QR is small, the band gap of the quantum rod QR may increase, and thus the wavelength range of the emitted light may decrease. Also, when the size of the quantum rod QR is large, the band gap of the quantum rod QR may decrease, and thus the wavelength range of the emitted light may increase.

Referring to FIG. 38, when an electric field is applied to the quantum layer 150e, a cholesteric liquid crystal molecule (?) C forms a texture structure in a homeotropic state, and a property in which the quantum rod QR exhibits fluorescence is significantly reduced. As a result, the quantum layer 150e is switched to the transparent mode.

Several embodiments of the display element according to the disclosed invention have been described above. The structure of the display element according to the disclosed invention is not limited to the above example. That is, the display element may have a structure in which a transparency adjustment layer, a quantum layer, and a liquid crystal layer are mixed and may include modifications that can be readily carried out by those skilled in the art. In addition, it will be appreciated that the display element according to the disclosed invention may be implemented in conjunction with an organic light-emitting diode (OLED) scheme or a liquid-crystal display (LCD) scheme.

A control method of the smart window system will be described below.

The control method of the smart window system according to an embodiment includes setting a control mode of a display element 110, determining a control condition of the display element 110 according to the set control mode, and controlling a state of the display element 110. For convenience of description, the control method will be described by using a display element 110 including a liquid crystal layer 140 and a transparency adjustment layer 130 (see FIGS. 2 to 10) as an example. However, the control method of the smart window system, which will be described below, may be applied to a display element 110 including a quantum layer 150e or a display element 110 including a liquid crystal layer 140 and a quantum layer 150e as well as a display element 110 having the above-described structure.

Figure 39:
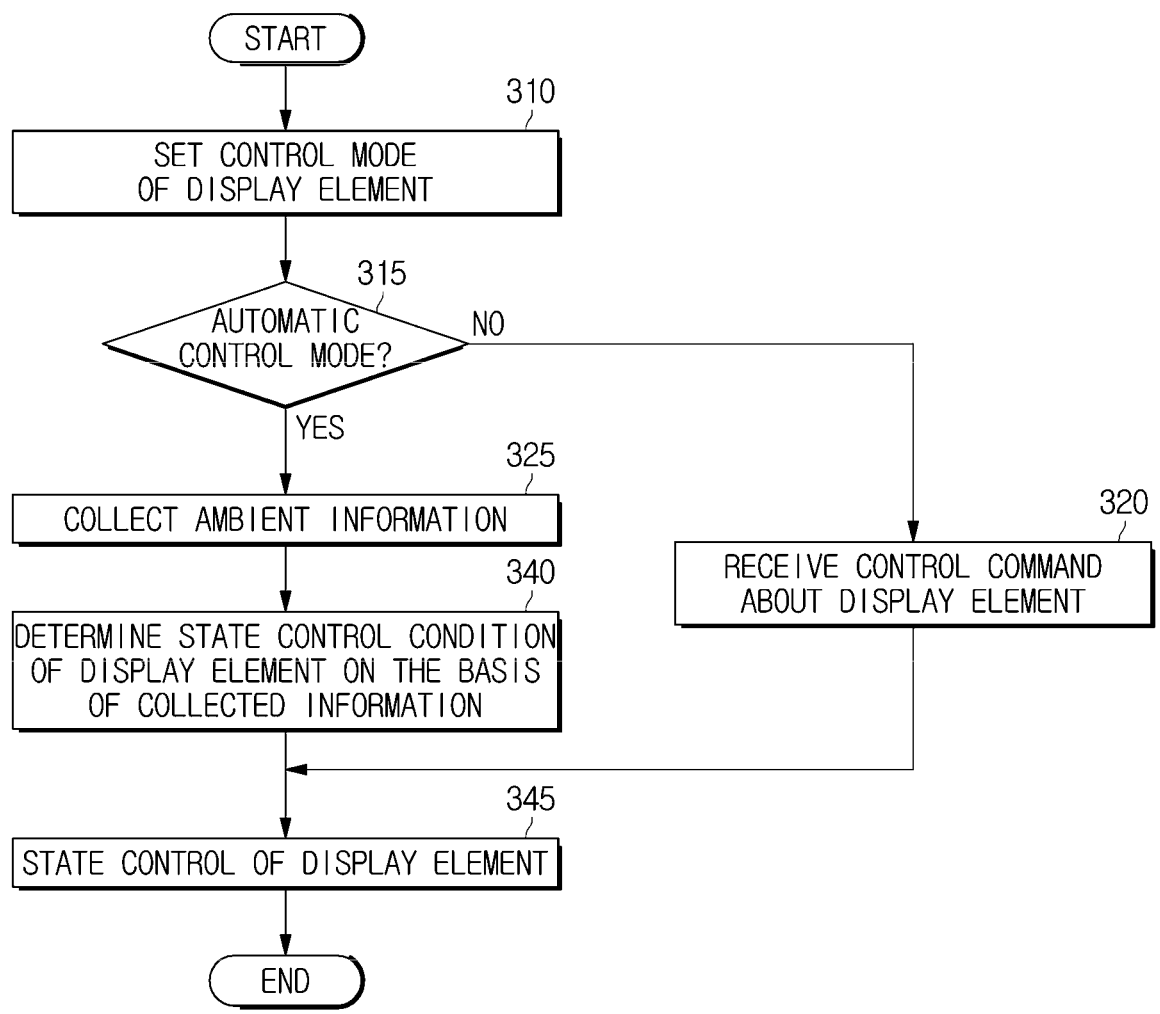
FIG. 39 is a flowchart showing a control method of a smart window system according to an embodiment.
Figure 40:
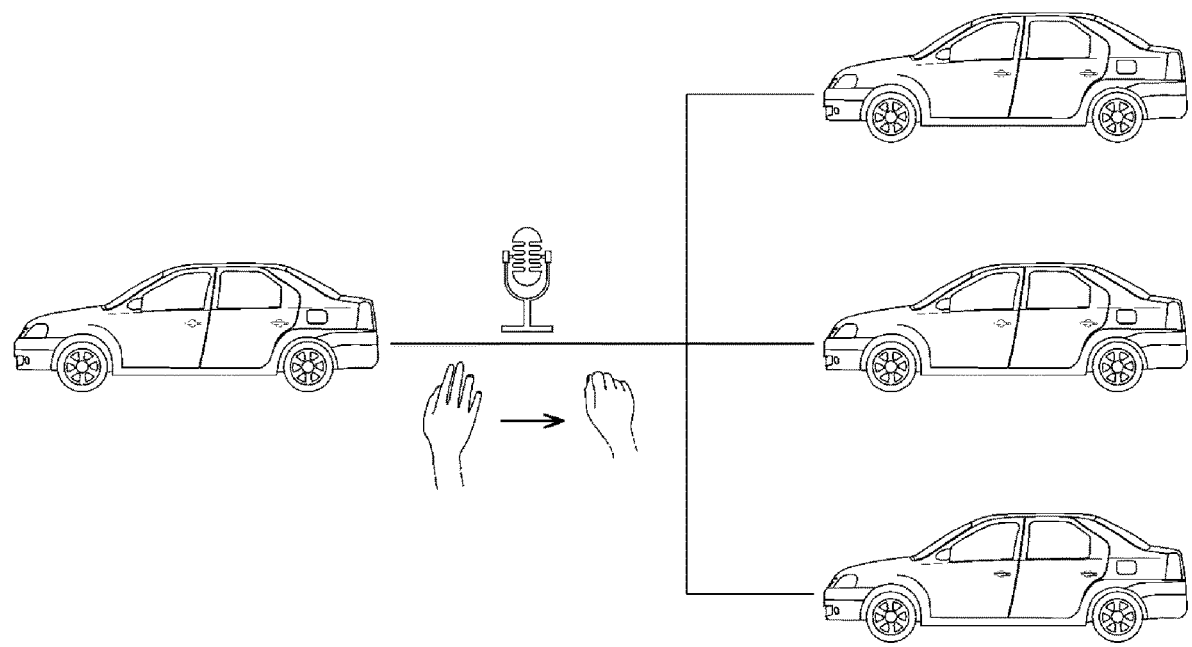
FIGS. 40 to 42 are views showing examples of control of the smart window system according to an embodiment.
Figure 41:
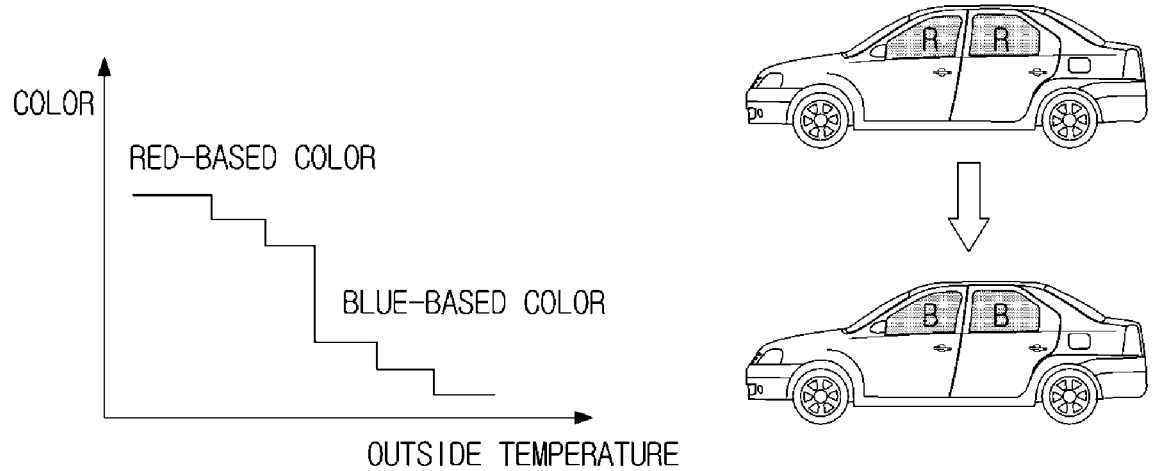
Figure 42:
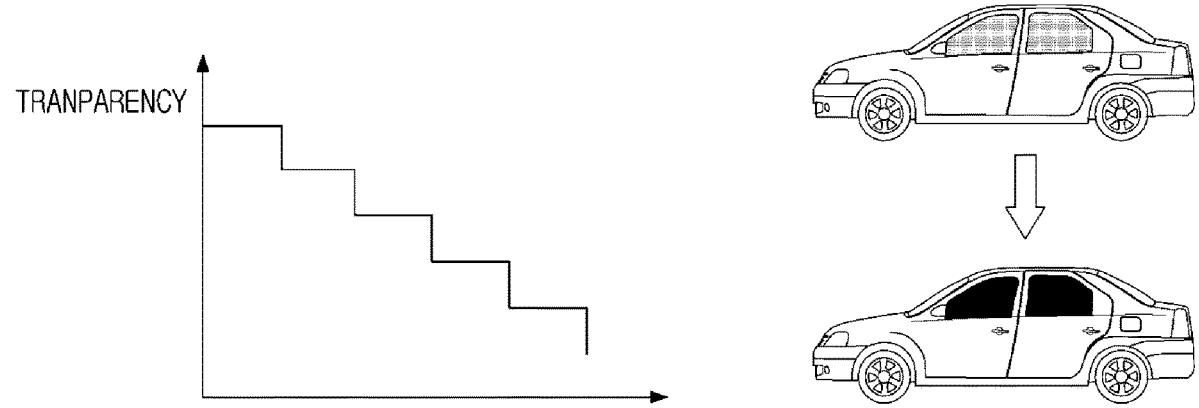

FIG. 39 is a flowchart showing a control method of a smart window system according to an embodiment, and FIGS. 40 to 42 are views showing examples of control of the smart window system according to an embodiment. For convenience of description, the control method of the smart window system will be described on the assumption that a state of a display element 110 is determined by a controller 180 of a smart window device 100.

Referring to FIG. 39, the control method of the smart window system according to an embodiment includes setting a control mode of the display element 110 (310), determining a control condition of the display element 110 according to the set control mode (340), and controlling a state of the display element 110 (345).

Specifically, the setting of a control mode of the display element 110 may include setting the control mode of the display element 110 to an automatic mode or a manual mode. The control mode may be set through an input device connected to the smart window device 100 in a wired or wireless manner. Depending on the embodiment, the control mode may be pre-programmed by a manufacture when a vehicle 10 is manufactured, and the setting conditions of the control mode may be changed by a user.

When the control mode of the display element 110 is set to a manual control mode, a step of receiving a control command for the display element 110 from the user may be performed (315, 320). In detail, the control command for the display element 110 may be received from the user through the input device, and the state of the display element 110 may be controlled according to the received control command.

When the control mode of the display element 110 is set to an automatic control mode, a process of collecting ambient information through a sensor unit 260 may be performed (315, 325). The sensor unit 260 may include at least one of a voice sensor, a gesture sensor, a temperature sensor, an illuminance sensor, and a distance sensor, and the sensor unit 260 may collect ambient information at predetermined intervals.

The voice sensor may collect the control command for the display element 110 provided in the form of a voice from the user and may output the control command to the controller 180. The gesture sensor may collect gesture information of the user and may output the gesture information to the controller 180. The temperature sensor may collect information regarding external or internal temperature of the vehicle 10 and may output the collected information to the controller 180. The illuminance sensor may collect information regarding external illuminance of the vehicle 10 and may output the collected information to the controller 180. The distance sensor may collect information regarding a distance between the vehicle 10 and an object outside the vehicle 10 and may output the collected information to the controller 180.

When the sensor unit 260 collects ambient information and outputs the collected ambient information to the controller 180, a state control condition of the display element 110 is determined on the basis of the collected information (340). In this case, the state control condition of the display element 110 may be determined by a program initially provided by a manufacturer and may be manually determined by the user.

According to an example, a gesture recognition condition collected by the gesture sensor may be provided prior to other conditions as the state control condition of the display element 110. Specifically, when a gesture command of the user is input while an external temperature condition of the vehicle 10 satisfies a predetermined temperature condition, a gesture detection condition of the gesture sensor may be determined as the control condition of the display element 110. Depending on the embodiment, when both of a detection condition of the distance sensor and the gesture detection condition of the gesture sensor are satisfied, the detection condition of the gesture sensor rather than the detection condition of the distance sensor may be determined as the control condition of the display element 110.

When the state control condition of the display element 110 is determined, the controller 180 may request state information of the display element 110 corresponding to the determined state control condition from the memory 170 and may receive the state information and control the state of the display element 110.

FIG. 40 is a view showing an example in which the state of the display element 110 is controlled when a voice recognition condition (or a gesture recognition condition) is determined as the state control condition of the display element 110.

Referring to FIG. 40, the state of the display element 110 may be adjusted according to user voice recognition information collected by the voice sensor (or gesture information detected by the gesture sensor).

For example, all side glass of the vehicle 10 may be adjusted to be transparent or opaque depending on information collected (or detected) by the voice sensor (or the gesture sensor), and one of two glasses may be adjusted to be opaque. Depending on the embodiment, a target to be controlled, transparency, and the like may be adjusted, and also color, a pattern, content displayed on the display element 110, and the like may be adjusted in addition to the transparency.

FIG. 41 is a view showing an example in which the state of the display element 110 is controlled when a temperature detection condition is determined as the state control condition of the display element 110.

Also, referring to FIG. 41, the state of the display element 110 may be adjusted according to the information regarding external temperature of the vehicle 10 detected by the temperature sensor.

For example, when the external temperature of the vehicle 10 is lower than a first temperature, the color of the display element 110 may be adjusted to a red-based color. When the external temperature of the vehicle 10 is higher than the first temperature, the color of the display element 110 may be adjusted to a blue-based color. Depending on the embodiment, a target to be controlled may be adjusted, and also transparency, a pattern, content displayed on the display element 110, and the like may be adjusted in addition to color.

FIG. 42 is a view showing an example in which the state of the display element 110 is controlled when external illuminance of the vehicle 10 is determined as the control condition of the display element 110.

Referring to FIG. 42, the state of the display element 110 may be adjusted according to external illuminance of the vehicle 10 detected by the Illuminance sensor.

For example, when the external illuminance of the vehicle 10 is lower than a first illuminance, the display element 110 may be adjusted to be transparent. When the external illuminance of the vehicle 10 is higher than the first illuminance, the display element 110 may be adjusted to be opaque. Depending on the embodiment, a target to be controlled, transparency, and the like may be adjusted, and also color, a pattern, content displayed on the display element 110, and the like may be adjusted in addition to the transparency.

Figure 43:
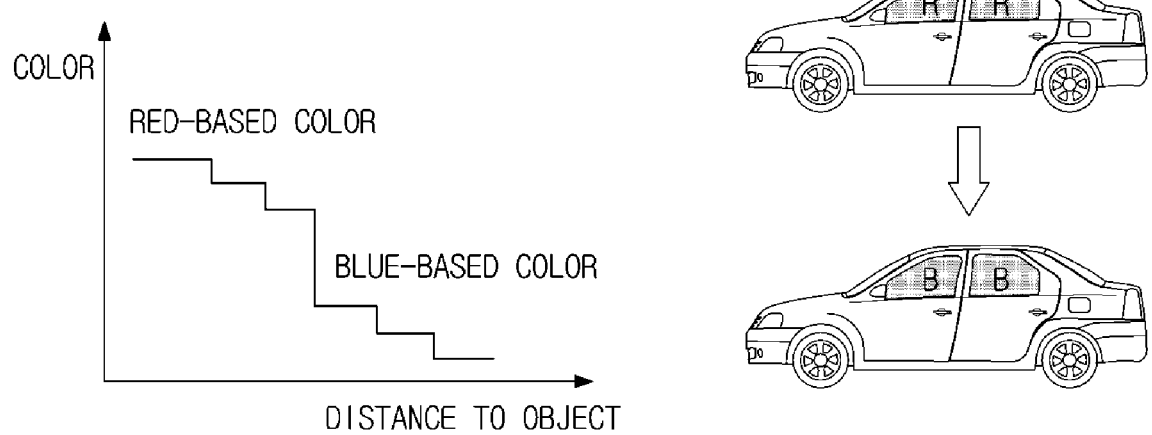
FIG. 43 is a view showing an example in which the state of the display element 110 is controlled when detection information of the distance sensor is determined as the control condition of the display element 110.

FIG. 43 is a view showing an example in which the state of the display element 110 is controlled when detection information of the distance sensor is determined as the control condition of the display element 110.

Referring to FIG. 43, the state of the display element 110 may be adjusted according to information regarding a distance from an external object collected by the distance sensor.

For example, when a distance between the vehicle 10 and an object outside the vehicle 10 is shorter than or equal to a first distance, the color of the display element 110 may be adjusted to a red-based color. Depending on the embodiment, the target to be controlled may be adjusted. According to an example, the color of the display element 110 in a direction in which an external object is detected may be adjusted and switched to a red-based color. Also, it will be appreciated that transparency, a pattern, content displayed on the display element 110, and the like may be adjusted in addition to color.

The control method of the smart window system according to an embodiment has been described above. Subsequently, a control method of a smart window system according to another embodiment will be described.

Figure 44:
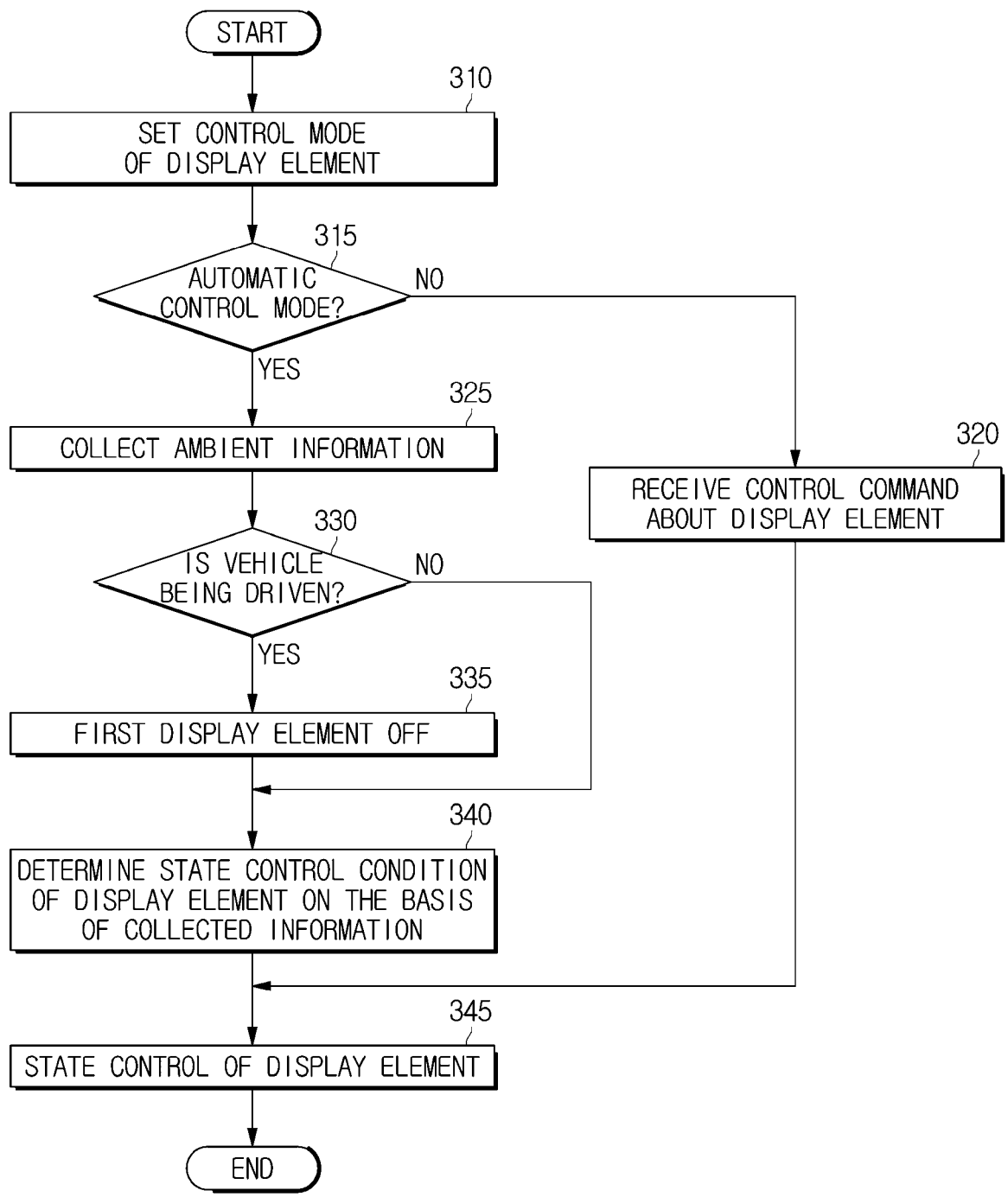
FIG. 44 is a flowchart showing the control method of the smart window system according to another embodiment.

FIG. 44 is a flowchart showing the control method of the smart window system according to another embodiment.

Referring to FIG. 44, the control method of the smart window system according to another embodiment includes setting a control mode of the display element 110 (310), determining a state control condition of the display element 110 according to the set control mode (340), and controlling a state of the display element 110 (345). Specifically, the control method of the display element 110 according to this embodiment differs from the control method of the smart window system according to the above-described embodiment in that a first display element provided in a front glass 12 (see FIG. 1) of the vehicle 10 is switched off while the vehicle 10 is operating in the automatic control mode. This is to prevent a driver's view from being disturbed while the vehicle 10 is running.

More specifically, when the vehicle 10 is running in the automatic control mode, the first display element may be switched off (330, 335). Subsequently, state control conditions of display elements other than the first display element may be determined according to the collected information (335, 340).

On the other hand, when the vehicle 10 is not running in the automatic control mode, the state control conditions of all the display elements may be determined according to the collected information (340).

While an embodiment of the present invention has been particularly shown and described, the embodiments are not limited to particular embodiments and it will be understood by those skilled in the art that various changes in form and details may be made therein without departing from the spirit and scope of the invention as defined by the appended claims.

The invention claimed is:

1. A smart window system comprising:
a display element comprising:
a transparency adjustment layer is configured to:
switch to a transparent mode or an opaque mode depending on whether power is applied, and
operate in the opaque mode when no electric field is applied to the transparency adjustment layer; and
a liquid crystal layer disposed adjacent to the transparency adjustment layer, the liquid crystal layer configured to reflect light having certain wavelengths to implement certain colors, the liquid crystal layer has a structure in which a first layer and a second layer are bonded to each other by using a buffer layer as a boundary therebetween, and cholesteric liquid crystals with different types of chirality are contained in the first layer and the second layer;
an input device configured to receive a control command for the display element; and
a controller configured to determine at least one of transparency, color, pattern, and gradation of the display element and information displayed on the display element on a basis of the control command, wherein the display element further comprises a quantum layer including a liquid crystal molecule and a quantum rod having a surface to which surfactant is bonded.

2. The smart window system of claim 1, further comprising a sensor unit configured to collect ambient information to control a state of the display element,
wherein the sensor unit includes at least one of an illuminance sensor, a temperature sensor, a distance sensor, a voice sensor, and a gesture sensor.

3. The smart window system of claim 1, wherein the transparency adjustment layer includes a cholesteric liquid crystal molecule and a black dye configured to form a helical structure along with the cholesteric liquid crystal molecule.

4. The smart window system of claim 1, wherein the transparency adjustment layer is further configured to:
operate in the transparent mode when an electric field is applied to the transparency adjustment layer.

5. The smart window system of claim 1, wherein:
the liquid crystal layer includes a plurality of liquid crystal layers configured to reflect light having different wavelength ranges, and
the plurality of liquid crystal layers are stacked vertically with respect to the display element or horizontally with respect to a virtual plane parallel to the display element.

6. The smart window system of claim 1, wherein the liquid crystal molecule includes at least one of a cholesteric liquid crystal molecule and a nematic liquid crystal molecule.

7. The smart window system of claim 1, wherein the quantum layer is arranged horizontally with respect to a virtual plane parallel to the display element.

8. The smart window system of claim 1, wherein:
the surfactant is bonded to at least one of both ends of the quantum rod, and
the surfactant has a portion bonded to the quantum rod and having a property of being favorable to the quantum rod and another portion having a property of being favorable to the liquid crystal molecule.

9. The smart window system of claim 1, further comprising a communicator configured to receive the control command for the display element from the input device.

10. A control method of a smart window system including an input device configured to receive a control command for a display element including a quantum layer including a liquid crystal molecule and a quantum rod having a surface to which surfactant is bonded; and a smart window device including the display element including a transparency adjustment layer switched to a transparent mode or an opaque mode depending on whether power is applied and a liquid crystal layer disposed adjacent to the transparency adjustment layer, the liquid crystal layer has a structure in which a first layer and a second layer are bonded to each other by using a buffer layer as a boundary therebetween, and cholesteric liquid crystals with different types of chirality are contained in the first layer and the second layer, and a communicator configured to receive the control command for the display element from the input device, the control method comprising:
operating the transparency adjustment layer in the opaque mode when no electric field is applied to the transparency adjustment layer;
receiving the control command for the display element through the input device;
delivering the control command to the display element through the communicator;
adjusting power applied to at least one of the transparency adjustment layer and the liquid crystal layer according to the control command to control at least one of transparency, color, pattern, and gradation of the display element and information displayed on the display element; and
wherein adjusting the power comprises adjusting the power applied to the liquid crystal layer to reflect light having certain wavelengths to implement certain colors.

11. The control method of claim 10, further comprising setting a control mode of the display element to an automatic mode or a manual mode.

12. The control method of claim 10, further comprising collecting ambient information,
wherein a state control condition of the display element is determined according to the collected ambient information, and a state of the display element is controlled according to the state control condition.

13. The control method of claim 10, further comprising:
operating in the transparent mode when an electric field is applied to the transparency adjustment layer.

14. The control method of claim 10, further comprising:
reflecting light having different wavelength ranges using a plurality of liquid crystal layers in the liquid crystal layer.

15. The control method of claim 14, wherein the plurality of liquid crystal layers are stacked vertically with respect to the display element or horizontally with respect to a virtual plane parallel to the display element.

* * * * *